United States Patent [19]
Dolan et al.

[11] Patent Number: 5,963,208
[45] Date of Patent: Oct. 5, 1999

[54] INTEGRATED NETWORK ACCESS USER INTERFACE FOR NAVIGATING WITH A HIERARCHICAL GRAPH

[75] Inventors: Michael Dolan, Alpine; Edwin Basart, Los Altos, both of Calif.

[73] Assignee: Michael A. Dolan, Alpine, Calif.

[21] Appl. No.: 09/115,459

[22] Filed: Jul. 14, 1998

Related U.S. Application Data

[63] Continuation of application No. 08/401,183, Mar. 9, 1995, Pat. No. 5,801,702.

[51] Int. Cl.$^6$ .................................................. G06F 3/00
[52] U.S. Cl. ..................... 345/357; 345/329; 395/200.47; 707/501
[58] Field of Search ..................... 345/326–358, 345/969; 395/200.47–200.49; 707/501

[56] References Cited

U.S. PATENT DOCUMENTS

| | | | |
|---|---|---|---|
| 5,295,244 | 3/1994 | Dev et al. ................................. | 395/161 |
| 5,500,929 | 3/1996 | Dickinson ................................ | 395/160 |
| 5,515,487 | 5/1996 | Beaudet et al. ...................... | 395/160 X |
| 5,530,852 | 6/1996 | Meske, Jr. et al. ..................... | 395/600 |
| 5,793,966 | 8/1998 | Arnstein et al. ................... | 345/200.48 |

Primary Examiner—John E. Breene
Attorney, Agent, or Firm—Gray Cary Ware & Freidenrich

[57] ABSTRACT

A multi-protocol network client in which a single, integrated user-interface is provided for accessing information according to a number of network access protocols. The accessed information is represented in a hierarchical graph which provides an intuitive and convenient navigation tool for both the experienced and the novice user. The user accesses information according to a particular network access protocol by merely selecting a graphical representation of an item the user wishes to access from the hierarchical graph. Information pertaining to the particular item whose representation is selected by the user is retrieved and used to determine the network access protocol according to which the item is accessed. As an item is retrieved from the network, links contained within the item are parsed from the item and added to the hierarchical graph. In particular, links which are embedded in the substantive information of an item, as is the case with HTML documents, are parsed from the item and added to the hierarchical graph. The user can thereafter retrieve an item referenced by a link parsed from a previously retrieved item by selecting from the hierarchical graph a representation of the parsed link. The hierarchical graph representing the retrieved links is simplified by excluding from the hierarchical graph representations of links which reference the item containing the link and which are redundant in view of other links represented in the hierarchical graph.

28 Claims, 14 Drawing Sheets

INTEGRATED NETWORK ACCESS USER INTERFACE FOR NAVIGATING WITH A HIERARCHICAL GRAPH

This is a continuation of Ser. No. 08/401.183, filed on Mar. 9. 1995, entitled: INTEGRATED NETWORK ACCESS USER-INTERFACE SYSTEM AND METHOD, now U.S. Pat. No. 5,801,702.

FIELD OF THE INVENTION

The present invention relates to computer networks and, in particular, an integrated user-interface for accessing a number of network services, at least some of which are accessed using different network protocols.

BACKGROUND OF THE INVENTION

Use of computer networks for information access is increasing very rapidly and is spreading from use which is generally limited to technical experts to use by intermediate and novice computer users as well. For example, Internet is a vast, global computer network which is growing in popularity at an amazing rate; the number of users of Internet is growing at approximately 4% per month. Many of the new users of the Internet computer network are relatively new users of computers generally.

Internet is a loosely organized network in which a number of different network access protocols have emerged over a period of years. For example, protocols for electronic mail ("email"), electronic group discussions (e.g., "Usenet news groups"), file transfers (e.g., "FTP"), file searching (e.g., "Archie" and "Gopher"), and complex, distributed data bases (e.g., WAIS and the World Wide Web) have been independently developed and have become very popular with users of Internet.

A user typically accesses information through a computer network such as Internet using a "client" of one of the network access protocols supported by at least a portion of the computer network. A client is a computer process which accesses information through a computer network, typically through a server computer process operating within the computer network, according to a specific network protocol. For example, a Usenet client is a computer process which accesses through a computer network electronic group discussion information according to the NNTP protocol. For each protocol used in Internet, for example, several different clients are available to users, either without cost through Internet itself as publicly available software or through commercial providers at a cost.

Each client typically accesses information through only a single protocol. For example, a World Wide Web ("WWW") client is typically used to view multimedia hypertext documents while a separate e-mail client is typically used to read email addressed to a particular user. As a result, a user who accesses information through Internet according to multiple protocols typically does so through multiple respective clients. Thus, a user who wishes to send e-mail to a colleague after having read something of interest in multimedia hypertext document using a WWW client generally uses a separate e-mail client to send the e-mail. Switching between clients to assimilate information between network protocols is, at best, an inconvenience and, perhaps more seriously, confusing and unmanageable for novice users. Switching between various clients for various respective network access protocols makes assimilation of information retrieved according such protocols difficult.

Furthermore, each client typically uses a user-interface which differs from those used by other clients and is particularly adapted to the network access protocol by which the client accesses information. As a result, a user which uses several different clients must master as many different user interfaces. A computer process which uses a user interface that is foreign to the user is often unusable for a novice user.

In addition to the difficulties associated with separate clients for the various network access protocols used in computer networks such as Internet, users often have difficulty navigating large, complex databases such as the World Wide Web ("WWW"). WWW is a database which implements the hypertext transfer protocol ("HTTP") which in turn supports transfer and access of multimedia hypertext documents. Multimedia documents are documents which can contain information from multiple media. e.g., numerical and textual data, graphical images, sounds in digital form, and motion video images. A hypertext document can contain pointers to, i.e. can reference, other documents which are embedded in the substantive information the hypertext document and which are associated with a portion of this substantive information, frequently a text portion. A pointer to an item of information is sometimes called a "link" herein. Identification by the user of substantive information associated with such an embedded link causes retrieval of the document referenced by the link.

Such hypertext documents, which generally conform to a hypertext markup language (HTML—"HTML documents") and which are accessible according to a particular network access protocol such as HTTP, can contain links to any other items, including HTML documents, which are accessible according to the particular network access protocol. In addition, such HTML documents frequently contain links to themselves and multiple, redundant links to another item. HTML documents can also contain links to non-HTML items, i.e., items which are accessed according to other, non-HTTP protocols, e.g., FTP.

As a result of the generality of the links of a HTML document, navigation of HTML documents can be somewhat confusing. As described above, an HTML document can contain links to itself and multiple redundant links to other items. In addition, several HTML documents can form a loop in which a user navigates in circles. For example, a first HTML document about pies can have a link whose text is "apple" and which points to a second HTML document about apples. The second HTML document can have a link whose text is "pies" and which points to the first HTML document. A user searching for information on apple pies could navigate in circles by selecting the "apple" link in the first HTML document, the "pies" link in the second HTML document, the "apple" link in the first HTML document, and so on. The user doesn't determine that the navigation path is circular until the user recognizes a previously retrieved HTML document. This illustrative example of a loop is simple and involves only two HTML documents. Other loops can be quite large and involve many documents. Furthermore, when a user retrieves an HTML document for the second time, the HTML document is retrieved through the computer network a second time, wasting time and network resources.

Furthermore, to select a link contained within an HTML document, the user must display the substantive information of the HTML document on a display device of a computer. Many HTML documents are far too large to be conveniently and completely displayed within many commonly used computer display devices. As a result, such large HTML documents are displayed in scrollable windows in which only a portion of the HTML document is displayed on the display device at a time. If a link which a user desires to follow is embedded in a portion of the HTML document which is currently not displayed in the scrollable window, the user must "scroll" through the HTML document using conventional techniques until the portion in which the desired link is embedded is displayed. Frequently a user desires information which is only accessible from a document whose location within a computer network is known by traversing a path of multiple links, requiring for each link followed retrieval of a document and reading and scrolling through the document to find the next link in the path. Retrieval of, reading of, and scrolling through multiple documents to find desired information is tedious, slow, and at times quite annoying to the user.

SUMMARY OF THE INVENTION

In accordance with the present invention, a multi-protocol network client is provided in which a single, integrated user-interface is provided for accessing information according to a number of network access protocols. The retrieved information is represented in a hierarchical graph which provides an intuitive and convenient navigation tool for both the experienced and the novice user. The user accesses information according to a particular network access protocol by merely selecting a graphical representation of an item the user wishes to access from the hierarchical graph. Information pertaining to the particular item whose representation is selected by the user is retrieved and used to determine according to which network access protocol the item is accessed. In the context of the Internet, an item is often referred to as a resource and can include, for example, files and directories.

As an item is retrieved from the network, links contained within the item are parsed from the item and added to the hierarchical graph. In particular, links which are embedded in the substantive information of an item, as is the case with HTML documents, are parsed from the item and added to the hierarchical graph. The user can thereafter retrieve an item referenced by a link parsed from a previously retrieved item by selecting from the hierarchical graph a representation of the parsed link. As a result, the user is provided with an intuitive and convenient mechanism for navigating such items without reading through or scrolling through the item to find the portion of the item containing a desired link. The hierarchical graph simultaneously provides novice users with a user-interface which is easy to understand and use and provides expert users with a mechanism for quickly and efficiently navigating large numbers of potentially large HTML documents, or similar items with embedded links, to pin-point specific information.

The hierarchical graph representing the retrieved links is simplified by excluding from the hierarchical graph representations of links which reference the item containing the link and which are redundant in view of other links represented in the hierarchical graph. By simplifying the hierarchical graph, the user is presented with a simplified, yet complete, graphical and hierarchical representation of all retrieved links and can accordingly navigate the retrieved links more quickly and efficiently.

It is an object of the present invention to provide a particularly convenient user interface for accessing items of information through a computer network.

It is a further object of the present invention to provide a single, integrated user-interface for accessing items through a computer network according to two or more network access protocols.

It is a further object of the present invention to provide a catalog of previously retrieved links which can be conveniently referenced by a user to immediately and directly access items of information referenced by such links.

It is a further object of the present invention to provide a catalog of previously retrieved links in a hierarchical, graphical representation which can be conveniently referenced by a user to immediately and directly access items of information referenced by such links.

It is a further object of the present invention to provide a persistent catalog of previously retrieved links such that a user can, in a subsequent session, quickly and efficiently retrieve information items retrieved in a previous session.

It is a further object of the present invention to provide a catalog of links embedded in substantive information of an information item.

It is a further object of the present invention to provide a catalog of links which is simplified, yet compete such that a user can access any item referenced by a retrieved link.

It is a further object of the present invention to provide a mechanism for minimizing repeated retrievals of items through a computer network.

It is a further object of the present invention to provide a mechanism for minimizing repeated retrievals of items through a computer network by persistently storing such retrieved items in a local memory.

Other objects of the present invention are apparent in view of the following detailed description.

DETAILED DESCRIPTION

In accordance with the present invention, a user navigates through information items accessible through a computer network according to any of two or more network access protocols by selecting icons of a hierarchical navigation graph displayed on a computer display screen. An information item is a set of information treated generally as a single unit in the context of a computer network. An example of an information item is a file stored in the computer network and can be, for example, a data file containing text, graphics, sounds, motion video or a combination thereof; a directory referencing zero or more other files; or a computer program which includes a number of computer instructions.

Figure 1:
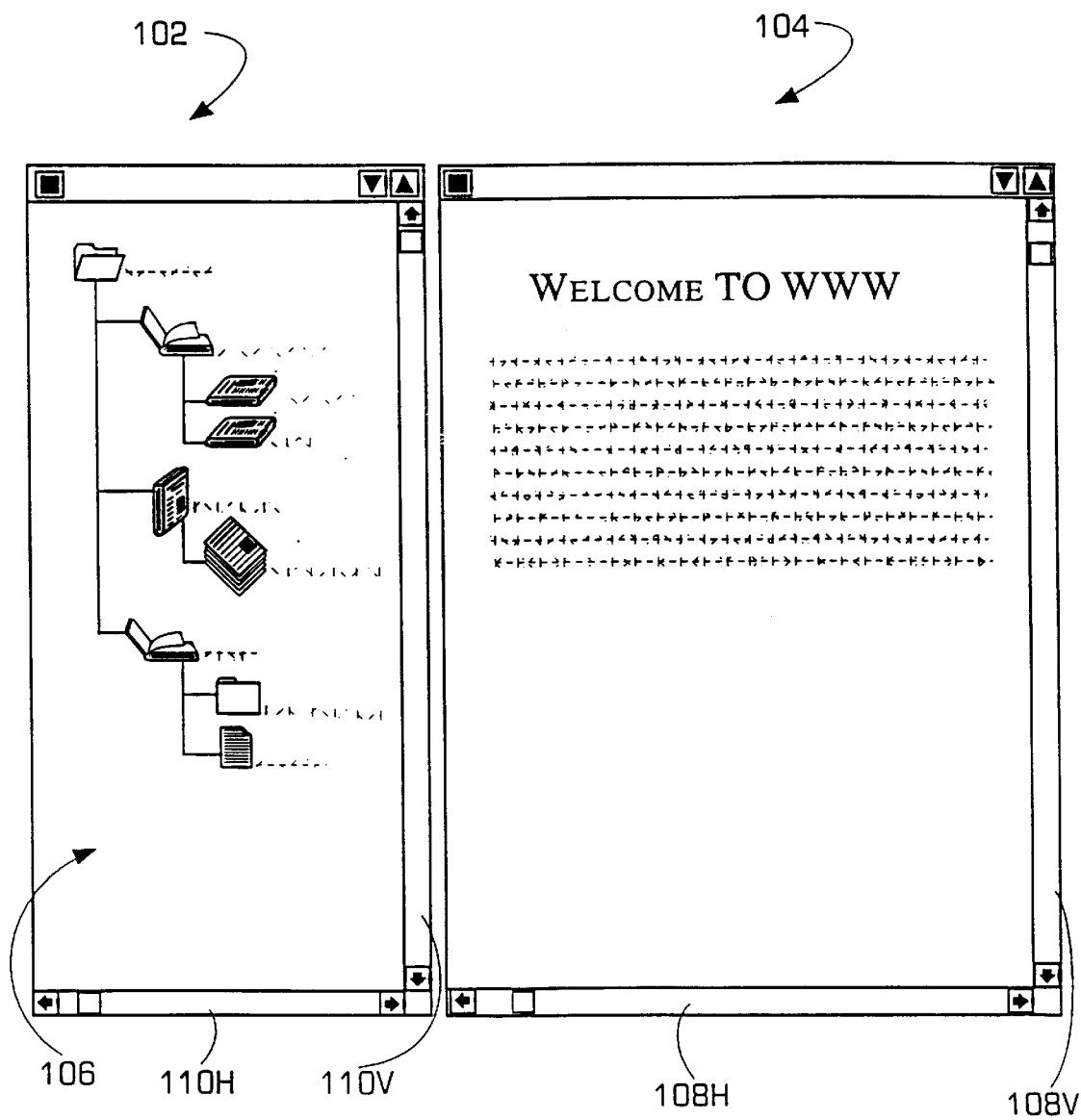
FIG. 1 is a diagram of a view window and a navigation window, which includes a navigation graph, displayed in a computer display device in accordance with the present invention.

FIG. 1 shows a navigation window 102 and a view window 104 in accordance with the present invention. View window 104 is displayed in a display screen of a computer system, which is described below more completely, and contains the substantive information of an item of information retrieved through a computer network according to one of the two or more network access protocols and presents the substantive information to the user. View window 104 can represent the information to the user in a conventional manner. As shown in FIG. 1, view window 104 includes scroll bars 108H and 108V which are used by the user to select a portion of the substantive information in view window 104 in a conventional manner. In addition, navigation window 102 similarly includes scroll bars 110H and 110V, which can be used by the user to view selected portions of navigation graph 106 when navigation graph 106 grows to such a size that the entirety of navigation graph 106 no longer fits within navigation window 102. Scroll bars are well known and are used, for example, in windows generated by the Windows operating system available from Microsoft Corporation of Redmond, Wash., and by the operating system used in Macintosh computers available from Apple Computer, Inc. of Cupertino, Calif.

Figure 2:
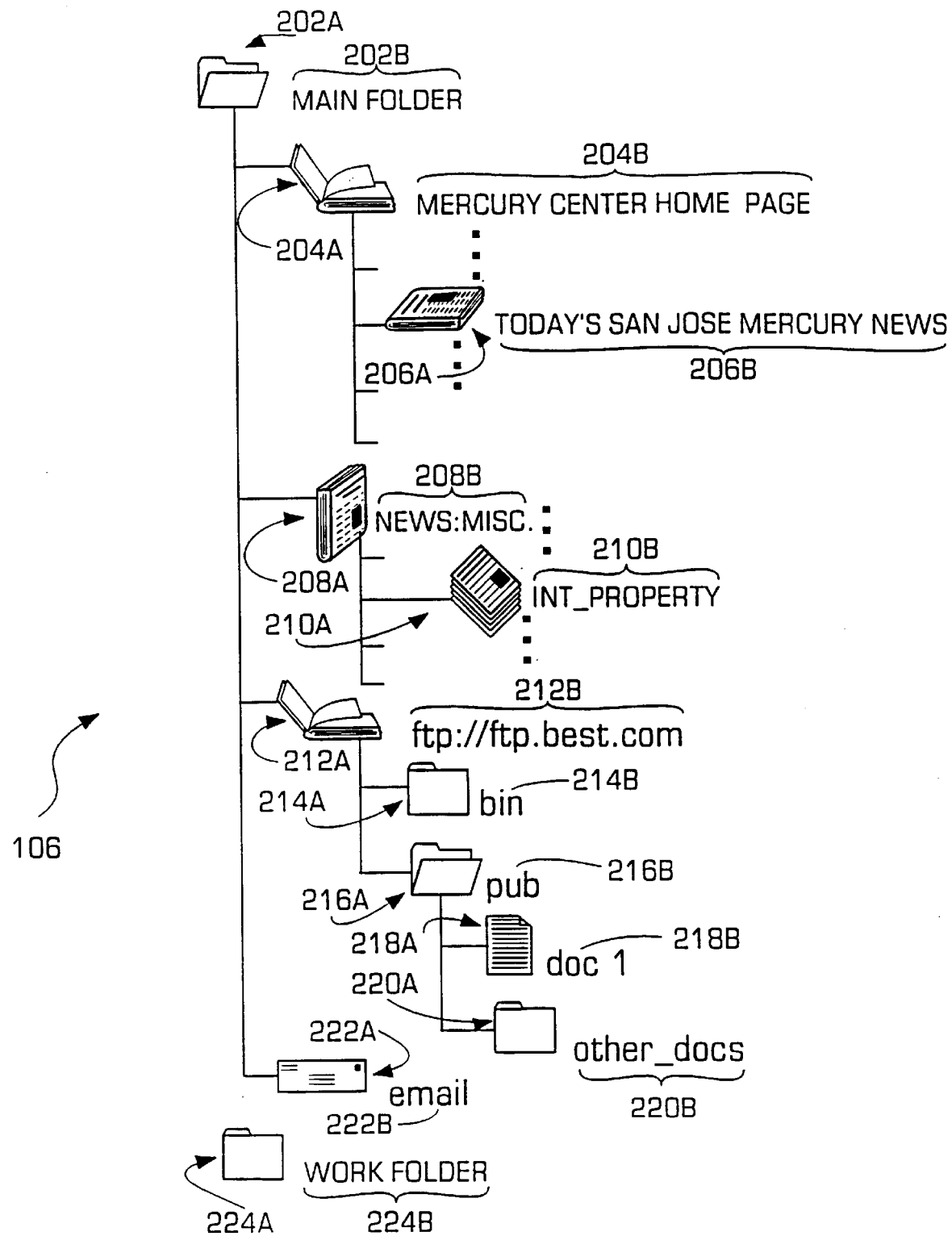
FIG. 2 is a diagram of the navigation graph of FIG. 1.

Navigation window 102 contains a navigation graph 106, which is shown in greater detail in FIG. 2 and which provides a novel, convenient, and intuitive user-interface by which the user can navigate through a number of information items accessible through a computer network to find specific information contained therein. "Navigation" as used herein generally refers to the process by which a user uses retrieved information to determine which information to next retrieve to find a desired piece of information.

As shown in FIG. 2, navigation graph 106 includes a number of icons and associated descriptions connected so as to represent inter-relations of a hierarchical structure. In navigation graph 106, icon 202A and associated description 202B represent a root node of navigation graph 106. As shown in FIG. 2, icon 202A represents a link whose children are represented by icons 204A, 208A, 212A, and 222A. A link references an item of information, which is in turn the subject item of the link. A child of a first link is a second link contained within the subject item of the first link. Thus, icon 202A represents a link whose subject item contains the links represented by icons 204A, 208A, 212A, and 222A. Inversely, a parent of a first link is a second link whose subject item contains the first link. In such a case, the first link is a child of the second link. Two links which share the same parent are peers. Links are described in greater detail below.

Icon 202A is shown as a folder to represent a general collection node, i.e., a node whose children can be of any type. Folder icons, e.g., icon 216A, are also used to represent directories of files which are accessible, for example, through a file transfer protocol such as FTP from computer systems of a computer network. The particular design of icon 202A and the other icons of FIG. 2 is not essential to the present invention, and other shapes and designs of icon can be used to present to the user the hierarchical inter-relationships between the various links represented in navigation graph 106. In fact, the icons shown in FIG. 2 are omitted from navigation graph 106 in one embodiment, and the user selects a link by selecting one of the descriptions shown in FIG. 2.

Icon 204A is shown as an open book and has a corresponding description 204O which is associated with icon 204A in navigation graph 106 and which identifies to the user the subject item of the link represented by icon 204A. A book Icon. e.g., icon 204A, is used to represent a document constructed of a hypertext markup language, i.e., an HTML document. The book icon is shown as an open book if children of the link represented by the book icon are shown in navigation graph 106. For example, icon 206A represents a child of the link represented by icon 204A and is included in navigation graph 106. Therefore, icon 204A is shown as an open book. Conversely, none of the children of the link represented by icon 206A are shown in navigation graph 106. Accordingly, icon 206A is shown as a a closed book.

Icon 208A is shown as a newspaper and represents a link to a classification of electronic group discussion accessible, for example, according to the Usenet newsgroup protocol. Navigation graph 106 associates with icon 208A a description 208B which identifies to the user the particular classification which is the subject of the link represented by icon 208A. The children of icon 208A, as represented in navigation graph 106, include representations of links to sub-classifications of electronic group discussion. An icon which represents a child of icon 208A is shown as a newspaper if the icon represents a link to a sub-classification which has further sub-classifications or as a stack of newspapers if the icon represents a link to a classification which has no sub-classifications but instead contains links to postings of an electronic group discussion. For example, icon 210A, which represents a child of icon 208A according to navigation graph 106, is shown as a stack of newspapers to show that icon 210A represents a link to postings of an electronic group discussion. The particular electronic group discussion which is the subject of the link represented by icon 210A is identified by a description 210B, which navigation graph 106 associates with icon 210A.

Icon 212A is shown as a book to represent a link to an item which can have children. Icon 212A represents a link to a root directory within the computer network accessed by a network file transfer protocol, e.g., the FTP file transfer protocol, and the subject host computer system of the link represented by icon 212A is identified to the user by a description 212B which is associated with icon 212A in navigation graph 106. The children of the link represented by icon 212A are directories of a file structure on the subject host computer system represented by icon 212A. For example, icon 216A is shown as a open folder to represent link to a directory of files, and the children of the link represented by icon 216A in navigation graph 106, namely, the links represented by icons 218A and 220A, are to respect items which are the contents of the subject directory of the link represented by icon 216A. Icon 218A is shown as a document and represents a link to a file within the subject directory of the link represented by icon 216A. The name of the file is associated with icon 218A as a description 218B in navigation graph 106. Icon 220A is shown as a folder to represent a link to a sub-directory of the subject directory of the link represented by icon 216A. Icon 220A is shown as a closed folder to represent that links to the contents of the subject directory of. i.e., the children of, the link represented by icon 220A are not shown in navigation graph 106.

Icon 222A is shown in navigation graph 106 as a letter and represents electronic mail accessed through the computer network according to an electronic mail protocol, e.g., the well-known Post Office Protocol (POP) used on Internet. The user can create, as children of the link represented by icon 222A, additional folders such as folders 214A–220A. The user can store individual e-mail messages in these folders. Thus, a structure similar to that represented by icons 214A–220A can be built beneath icon 222A.

Icon 224A represents a folder created by the user for classification and organization of items accessible through the computer network. Icon 224A is directly analogous to folder 202A described above. Icon 224A, like icon 202A, represents an organizational construct and does not represent a link to a specific item accessible through the computer network. By using a drag-and-drop user-interface, the user can move and reorganize links to suit the particular needs of the user. For example, the user can drag icon 210A from the position shown in FIG. 2 and drop icon 210A over icon 224A. In response, link represented by icon 210A is removed from a list of children of the link represented by icon 208A and is added to a list of children of the link represented by icon 224A. Navigation graph 106 is redrawn such that icon 210A is represented as a child of icon 224A and not icon 208A. In this way, the user can assimilate and group information from various sources accessible through the computer network according to various network access protocols.

Thus, navigation graph 106 represents hierarchical relationships of a number of items accessible through a computer network according to multiple network access protocols. In the manner described more completely below, a user retrieves and views any of the subject items of links represented in navigation graph 106 by merely selecting an icon representing a link to a desired item. Before describing the selection, retrieval, and display of items in greater detail, the computer system in which navigation graph 106 is created, managed, and displayed is described in conjunction with FIG. 3.

Figure 3:
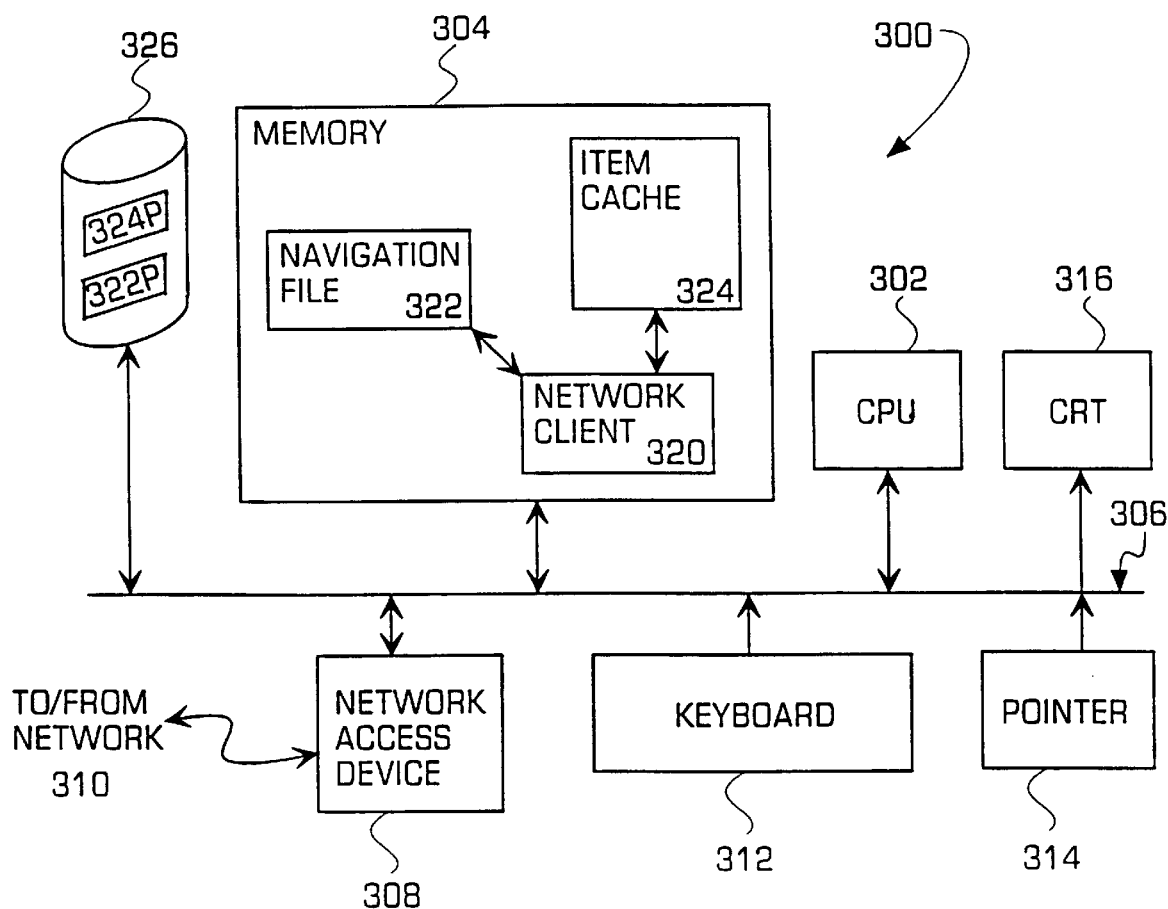
FIG. 3 is a block diagram of a computer system in accordance with the present invention.

FIG. 3 is a block diagram of a computer system 300. Computer system 300 includes a central processing unit (CPU) 302 which communicates with a memory 304 through a bus 306. CPU 302 can be, for example, a personal computer based on either the 80486 microprocessor or the Pentium microprocessor, either of which is available from Intel Corporation of Santa Clara, Calif. Memory 304 can include any number of currently available electronic and magnetic memories including without limitation randomly accessible memory (RAM), read-only memory (ROM), and secondary storage units such as magnetic and optical storage media. Computer system 300 further includes persistent storage device 326 which is coupled to bus 306 and which can be, for example, a large capacity magnetic disk drive. CPU 302 can read from or write to persistent storage device 326 through bus 306.

Computer system 300 also includes a network access device 308, which is coupled to bus 306 and is in communication therethrough with CPU 302. Network access device 308 is also coupled to a computer network 310 (not shown) and can communicate with other host computer systems of computer network 310 through similar network access devices. Network access device 308 can be any digital communications interface used to couple a computer system to a computer network and can include, without limitation, modems and generally transceivers for communicating through various high-speed communications media. e.g., radio-frequency, fiber-optic, satellite, microwave, infrared, and wired signal transceivers. In one embodiment, network access device 308 is a modem and accesses computer network 310 through the public-switched telephone network (PSTN). Computer network 310 can be any type of computer network and can be a local-area network (LAN) such as an Ethernet network or a wide-area network (WAN) such as the Internet.

Computer system 300 also includes a keyboard 312 and a pointing device 314, which communicate with CPU 302 through bus 306 and through which a user supplies information and commands to CPU 302. Pointing device 314 can be any pointing device, sometimes referred to as a locator, by which a user specifies a point in two-dimensional space. Such a pointing device can be, without limitation, an electronic mouse, a trackball, a lightpen, a touch-sensitive screen, a tablet, a digitizing table, or thumbwheels. A computer display device 316 is coupled to bus 306 and receives information from CPU 302 through bus 306 and displays that information for viewing by the user. Computer display device 316 can be any display device including, without limitation, a cathode ray tube (CRT), LED display, or LCD display.

CPU 302 executes, from memory 304, a computer process 320, which is sometimes referred to herein as network client 320. Network client 320 creates and displays navigation graph 106 (FIGS. 1 and 2) and enables the user to use the display of navigation graph 106 to select items to be retrieved through computer network 310 (FIG. 3) and to view the retrieved items. As described more completely below network client 320 stores the structure of navigation graph 106 (FIG. 1) in a navigation file 322 (FIG. 3) in memory 304 and stores a number of items retrieved through computer network 310 in a item cache 324. Navigation file 322 can be stored persistently, i.e., so as to remain in storage when power is no longer supplied to computer system 300, as navigation file 322P in persistent storage device 326. Similarly, item cache 324 can be stored persistently as item cache 324P in persistent storage device 326.

Figure 4:
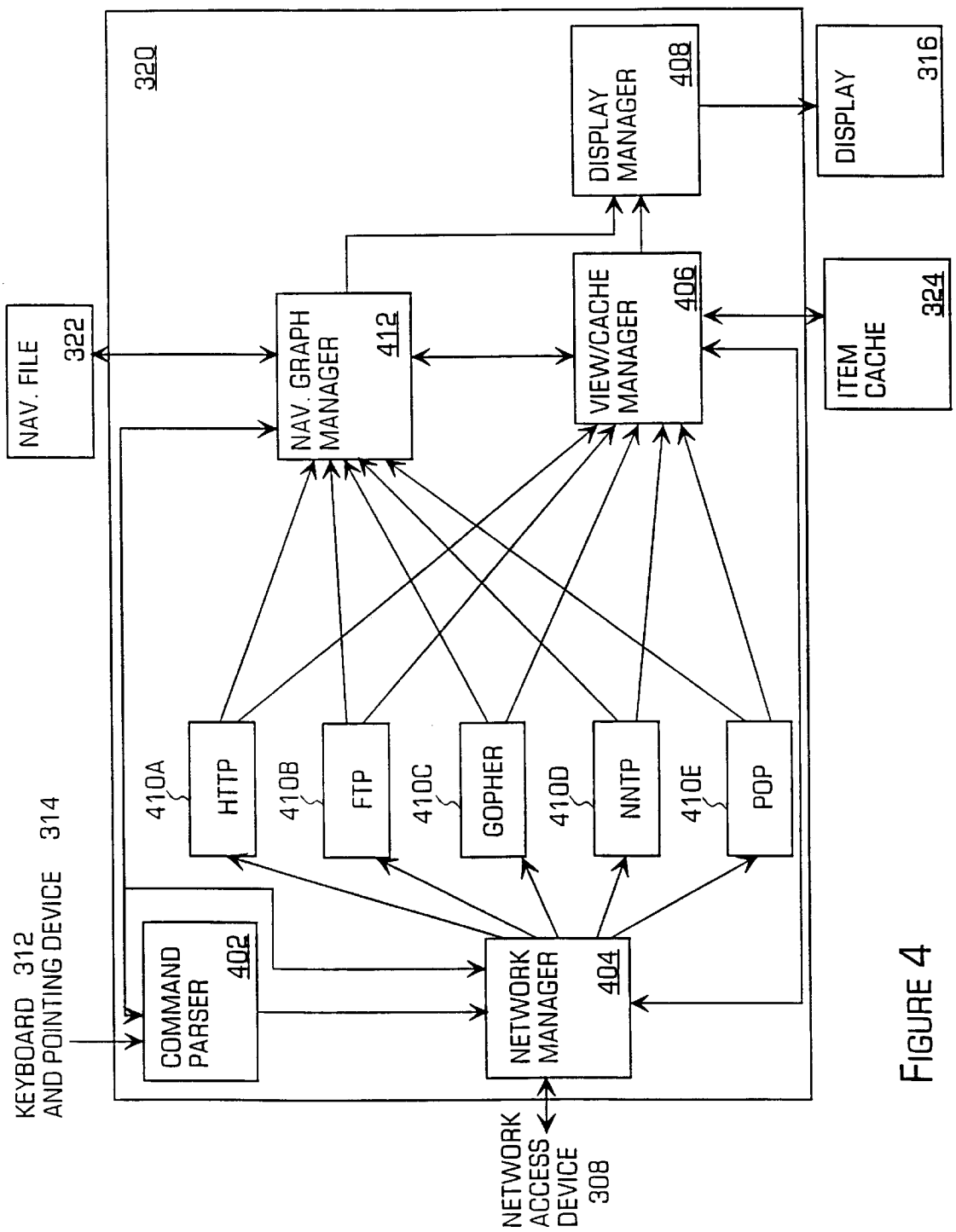
FIG. 4 is a block diagram of a network client in accordance with the present invention.
Figure 5:
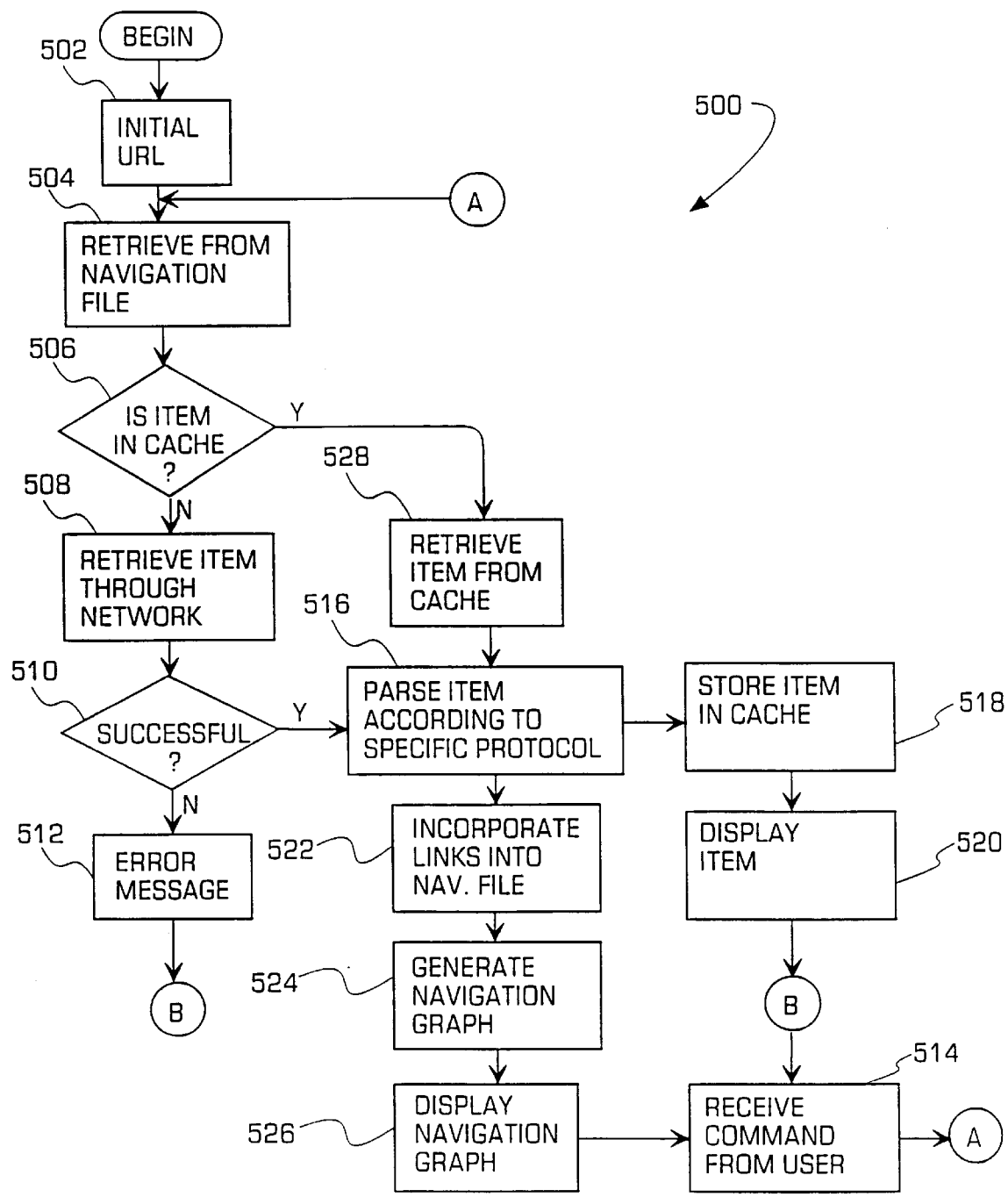
FIG. 5 is a logic flow diagram of the retrieval and display of items and the generation and display of a navigation graph in accordance with the present invention.
Figure 6:
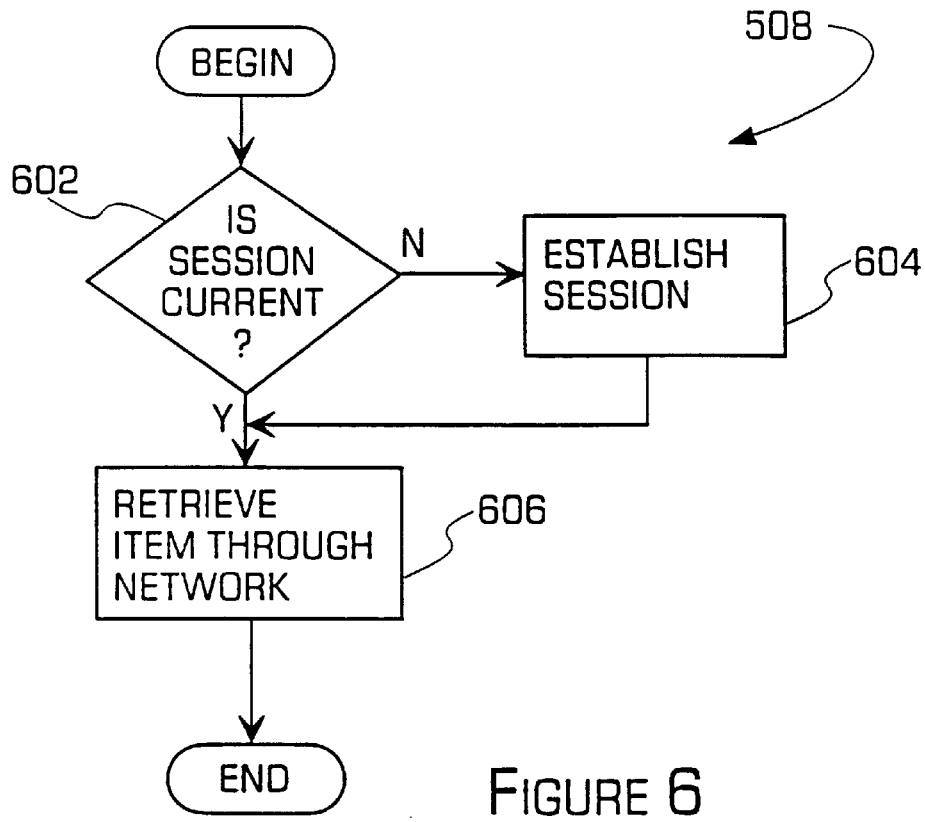
FIG. 6 is a logic flow diagram of the retrieval of an item through a computer network.

Network client 320 is shown in greater detail in FIG. 4. In addition, the general operation of network client 320 is illustrated by logic flow diagram 500 (FIG. 5). When execution of network client 320 is first initiated, navigation file does not exist and the user enters a universal resource name (URN) using keyboard 312. A URN uniquely identifies an item accessible through computer network 310 (FIG. 3) and directly or indirectly specifies the particular network access protocol according to which the identified item is accessible. In the context of the Internet, URNs are not yet implemented. Instead, universal resource locators (URLs) are currently used. URLs are a specific classification of URN, and, with respect to the present invention, either URNs or URLs can be used to uniquely identify an item accessible through computer network 310. Network client 320 accepts the URN from the user in step 502 (FIG. 5). Network client 320 includes a command parser 402 (FIG. 4) which receives commands generated by the user through keyboard 312 and pointing device 314. Command parser 402 receives the URN entered by the user and issues signals to a network manager 404, which is also part of network client 320, the signals specifying a request to retrieve, either through computer network 310 (FIG. 3) or from item cache 324, the item identified by the URN, which is sometimes referred to as the requested item.

In step 504, network manager 404 queries a navigation graph manager 412 to retrieve from navigation file 322 through navigation graph manager 412 information pertaining to the requested item. As described below, information pertaining to links previously encountered by network client 320, and information pertaining to items referenced thereby, is stored in navigation file 322. Such information includes whether the such an item is stored in item cache 324. Processing transfers from step 504 (FIG. 5) to test step 506.

In test step 506, network manager 404 determines whether the requested item is stored in item cache 324. Network manager 404 determines that the requested item is not in item cache 324 if no information pertaining to the requested item is found in navigation file 322 or if information retrieved therefrom indicates that the requested item is not stored in item cache 324. Network manager 404 determines that the requested item is stored in item cache 324 if information retrieved from navigation file 322 so indicates. Since item cache 324 is initially empty or, in one embodiment, does not exist, no information pertaining to the requested item is retrieved from navigation file 322 and network manager 404 determines that the requested item is not stored in item cache 324. Accordingly, processing transfers to step 508 in which network manager 404 retrieves the requested item through computer network 310.

The retrieval of the requested item through computer network 310 is illustrated in logic flow diagram 508 (FIG. 11). In test step 1102, network manager 404 determines whether a session between computer system 300 (FIG. 3) and one or more other computer systems of computer network 310 is currently established. If such a session is not currently established, processing transfers to step 1104 in which network manager 404 (FIG. 4) establishes such a session by issuing appropriate signals to network access device 308. Network access device 308 and network manager 404 cooperate to establish a session between computer system 300 (FIG. 3) and a computer system of computer network 310, through which the identified item is accessible, according to conventional techniques. Once such a session is established, processing transfers to step 1106. In addition, if network manager 404 determines in test step 1102 that a session between computer system 300 and one or more computer systems of computer network 310 is currently established, step 1104 is unnecessary and processing transfers directly from test step 1102 to step 1106. In step 1106, network manager 404 (FIG. 4) issues to one or more computers of computer network 310 through network access device 308 a request for retrieval of the requested item. From step 506, processing according to logic flow diagram 508 (FIG. 11) terminates and step 508 (FIG. 5) completes. Processing transfers therefrom to test step 510 in which network manager 404 determines whether the requested item was successfully retrieved in step 506. If the requested item is not successfully retrieved, processing transfers to step 512 in which an error message is generated by network manager 404 and is displayed to the user through a view/cache manager 406 and a display manager 408, both of which are described below more completely. Processing transfer from step 512 to step 514 in which network client 320 receives, through command parser 402, a command from the user to retrieve another item. As described below more completely, the command can be a URN entered by the user or selection of an icon of navigation graph 106 in navigation window 102. In addition, selection by the user using conventional techniques of a link displayed in view window 104 also generates a command to retrieve the item referenced by the selected link. If the command is in the form of a selection by the user of an icon of navigation graph 106 (FIGS. 1 and 2), command parser 402 retrieves from navigation graph manager 412 a universal resource name (URN) from the link record representing the identified link. Command parser 402 (FIG. 4) then supplies the URN retrieved from the navigation file to network manager 404 which retrieves the identified item in the manner described with respect to the other steps of logic flow diagram 500.

If, in test step 510, network manager 404 determines that the requested item is successfully retrieved, processing transfers to step 516 in which network manager 404 supplies the requested item to one of a number of filters 410A–E. Each of filters 410A–E parses items retrieved through computer network 310 (FIG. 3) according to a respective, corresponding network access protocol. For example, filters 410A–E parse items according to the hypertext transfer protocol (HTTP) for transferring HTML documents, the file transfer protocol (FTP) for transferring files, the Gopher network access protocol for accessing files organized according to a menu structure, the network news transfer protocol (NNTP) for electronic discussion groups, and the Post Office Protocol (POP) for electronic mail, respectively. As described more completely below, each of filters 410A–E parses from items links to other items and communicates those links to a navigation graph manager 412 and transfers the parsed items to view/cache manager 406.

Filter 410A parses the requested item according to HTML and formats for presentation to the user through display device 316 and perhaps other output devices such as an audio speaker (not shown) of computer system 300 (FIG. 3) text, graphics, sound, and motion video, which collectively form the substantive information of the requested item, i.e., the information intended to be conveyed to the user. The formatted substantive information of the requested item is supplied to view/cache manager 406 for storage in item cache 324 in step 518 and is supplied to display manager 408 for presentation to the user in step 520. In step 518, view/cache manager 406 receives from one of filters 410A–E the parsed item and stores the item in item cache 324 and sends the parsed item to display manager 408. In step 520, display manager 408 performs a number of conventional graphical operations to display visual components of the substantive information of the requested item in view window 104 (FIG. 1) which is displayed in display device 316 (FIGS. 3 and 4).

As filter 410A parses the requested item, links embedded in the substantive information of the request item are parsed and incorporated into the substantive information for presentation to the user in a conventional manner. In an additional, novel manner, the parsed links are supplied to navigation graph manager 412 for incorporation Into navigation file 322 in step 522 as described more completely below.

Filters 410B–E operate in a somewhat analogous fashion to the operation of filter 410A. Filter 410B parses the requested item according to the FTP file transfer protocol. Accordingly, the requested item is either a directory, in which case the requested item is little more than a list of links, or a file, in which case the requested item contains no links recognized by the FTP file transfer protocol. Filter 410C parses the requested item according to the Gopher network access protocol. Accordingly, the requested item is either a Gopher menu, in which case the requested item is little more than a list of links, or a file, in which case the requested item contains no links recognized by the Gopher network access protocol. Filter 410D parses the requested item according to the NNTP electronic news protocol. Filter 410E parses the requested item according to the POP electronic mail protocol.

Navigation graph manager 412 creates and maintains navigation file 322 and generates from navigation file 322 and displays through display manager 408 navigation graph 106 (FIGS. 1 and 2). Navigation file 322 records all links parsed from all documents retrieved through computer network 310 by network manager 404 and records interrelationships between those links as described more completely below. In step 522, navigation graph manager 412 creates new link records, which are described below in greater detail and which represent the links parsed from the retrieved item, and incorporates those link records into navigation file 322. Processing transfers from step 522 to step 524 in which navigation graph manager 412 constructs from navigation file 322 a new navigation graph 106 and sends the newly constructed navigation graph 106 to display manager 408. In step 526, display manager 408 performs a number of conventional graphical operations to display navigation graph 106 (FIG. 1) in navigation window 102 on display device 316 (FIG. 3).

As shown in logic flow diagram 500, steps 518 and 520 form a first processing path and steps 522, 524, and 526 form a second processing path. The first and second processing paths can be executed in parallel. The steps of the first processing path can be executed before, during, or after any of the steps of the second processing path. Similarly, the steps of the second processing path can be executed before, during, or after any of the steps of the first processing path. From steps 520 and 526, processing transfers to step 514 in which a subsequent command is received from the user as described above.

Thus, after the user has entered an initial URN, the item identified by the URN is retrieved, stored in item cache 324, and displayed in view window 104 (FIG. 1) of display device 316 (FIG. 4). In addition, any links to other items contained within the retrieved item are represented by link records in navigation file 322 and are represented in navigation graph 106 (FIG. 1) in navigation window 102 displayed in display device 316 (FIG. 4). Subsequent commands entered by the user are processed as described above except that, with respect to subsequent commands, the requested item may be determined by network manager 404 in test step 506 to be stored in item cache 324. If such is determined, processing transfers from test step 506 to step 528.

In step 528 the requested item is retrieved from item cache 324 in memory 304 (FIG. 3) and not through network access device 308. Since memory 304 (FIG. 3) is generally accessed much more quickly than computer network 310, retrieving items from item cache 324 in memory 304 rather than through computer network 310 greatly improves performance of network client 320. Processing transfers from step 528 to step 516 in which the requested item retrieved from item cache 324 is parsed as described above.

Figure 7:
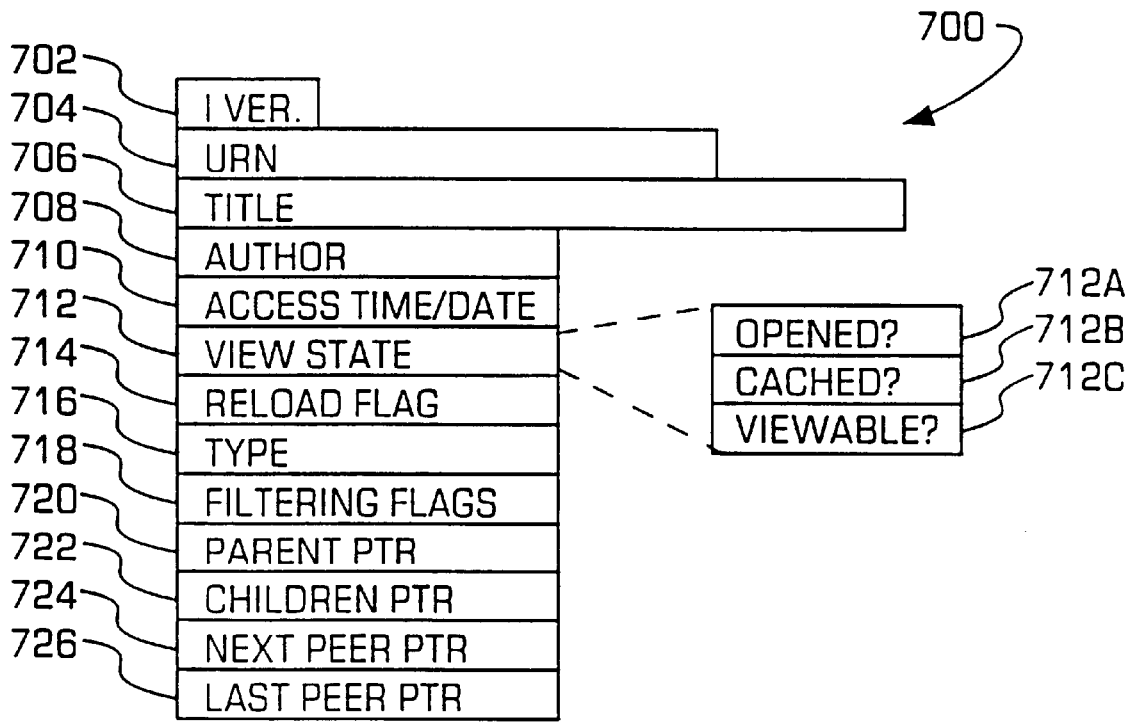
FIG. 7 is a block diagram of a link record in accordance with the present invention.

As described above, navigation file 322 includes one or more link records representing the hierarchical structure of navigation graph 106 (FIG. 2). FIG. 7 is a block diagram of a link record 700. Link record 700 includes a number of fields, each of which includes data defining an attribute of the link represented by link record 700. Link record 700 includes a version field 702, a URN field 704, a title field 706, an author field 708, an access time/date field 710, a view state field 712, a reload flag field 714, a type field 716, a filtering flags field 718, a parent pointer field 720, a children pointer field 722, a next peer pointer field 724, and a last peer pointer field 726.

Version field 702 contains data specifying a particular version of network client 320 (FIGS. 3 and 4) with which item record 700 (FIG. 7) was created. In one embodiment of the present invention, navigation file 322 (FIGS. 3 and 4) is persistent and stores link records generated by network client 320 during a previous execution of network client 320. In this embodiment, version field 702 is omitted from link record 700 when network client 320 is executing and version field 702 is included in link record 700 when network client 320 is idle and navigation file 322 is stored persistently in non-volatile memory within memory 304. e.g., non-volatile RAM, EPROM, or magnetic or optical storage media.

URN field 704 of link record 700 specifies the URN of an item to which a link represented by link record 700 points, which is referred to as the subject item of link record 700. In one embodiment. URN field 704 contains text data specifying the URN of the subject item. In such an embodiment, URN field 704 contains text data and data specifying the length of the text data. In another embodiment, URN field 704 contains a pointer to text data which is stored elsewhere in memory 304 and which specifies the URN of the subject item.

Title field 706 of link record 700 specifies the title of the subject item. The title of the subject item is generally a textual description of the subject item and is used to inform the user as to the general nature of the subject item. In one embodiment, title field 706 contains text data specifying the title of the subject item. In such an embodiment, title field 706 contains data specifying the length of the text data and the text data itself. In another embodiment, title field 706 contains a pointer to text data which is stored elsewhere in memory 304 and which specifies the title of the subject item.

When a link is parsed from an item by one of filters 410A–E as described above, the title of the item to which the link points is typically not known. Therefore, when link record 700 is first created, title field 706 is typically empty, i.e., contains no title data. When such is the case, display manager 408 associates within navigation graph 106 (FIG. 2) as a description, e.g., description 212B, the URN of the subject item. When the subject item is later retrieved as described above, the title of the subject item is parsed from the subject item by one of filters 410A–E according to the particular protocol parsed by the one of filters 410A–E and the title of the subject item is stored in title field 706 (FIG. 7) by navigation graph manager 412 (FIG. 4). Navigation graph manager 412 then issues signals to display manager 408 causing display manager 408 to update the display of navigation graph 106 (FIG. 2) in display device 316, thereby displaying the title of the subject item to the user.

Author field 708 of link record 700 contains data specifying the author of the subject item if the protocol to which the subject item conforms includes specification of an author and is empty otherwise. As described above with respect to URN field 704 and title field 706, author field 708 can include text data directly, in which case data specifying the length of the text data can also be included in author field 708, or can include a pointer to text data stored elsewhere in memory 304.

Access date/time field 710 contains data specifying the date and time the subject item was last retrieved from either item cache 324 (FIG. 3) or computer network 310. Each time an item referenced by a link represented by link record 700 is parsed by one of filters 410A–E (FIG. 4), navigation graph manager 412 updates the data stored in access date/time field 710 to specify the current date and time. View/cache manager 406 uses access date/time field 710 in managing item cache 324. Each time a new item, which is not already stored in item cache 324, is to be stored in item cache 324, view/cache manager 406 determines whether the new item can be stored in item cache 324 without item cache 324 exceeding a prescribed maximum size, which is set according to data entered by the user. If the prescribed maximum size provides insufficient space to store the new item in item cache 324, view/cache manager 406 removes items from item cache 324 according to a least-recently-used scheme until item cache 324 has sufficient space in which to store the new item. The particular items removed from item cache 324 are determined by reference to access date/time fields of corresponding link records. For example, view/cache manager 324 determines the date and time of the most recent access of the subject item of link record 700 by requesting from navigation graph manager 412 the contents of access date/time field 710. View/cache manager 406 retrieves the dates and times of most recent access of each item stored in item cache 324 and removes those items whose most recent access is the earliest in time until sufficient space remains in item cache 324 to store the new item. It is appreciated that other methods for determining which items to remove from item cache 324 can be used, including well-known least-recently-used methods in a counter is used instead of date/time information. When using such methods, other fields used to implement such methods, e.g., a counter field (not shown), are included in link record 700.

View state 712 of link record 700 includes three flags, i.e., opened flag 712A, cached flag 7128, and viewable flag 712C. Opened flag 712A contains data indicating whether the children of the link represented by link record 700 are visible in navigation graph 106 (FIG. 2). For example, the opened flag of the link record represented by icon 206A indicates that the children of that link record are not represented in navigation graph 106, i.e., that the subject item is "closed." Conversely, the opened flag of the link record represented by icon 204A indicates that the children of that link record are represented in navigation graph 106, i.e., that the subject item is "opened." In one embodiment, the user toggles, i.e., switches from one to the other of two possible values, opened flag 712A by identifying the icon within navigation graph 106 (FIG. 1) which represents link record 700. For example, the user identifies an icon, in one embodiment, by manipulating pointing device 314 to position a cursor (not shown) within navigation window 102 over the Icon and actuates pointing device 314 by pressing a button thereon. In this embodiment, toggling opened flag 712A from data indicating a "closed " state to data indicating an "opened" state causes retrieval, parsing, and display of the subject item of link record 700 in the manner described above. In this same embodiment, toggling opened flag 712A from data indicating an "opened" state to data indicating a "closed" state causes the subject item of link record 700 to no longer be displayed and causes navigation graph 106 to not display icons and corresponding descriptions representing links contained within the subject item, i.e., children of the link represented by link record 700. In an alternative embodiment, toggling opened flag 712A does not affect the display of view window 104 (FIG. 1) but only affects navigation graph 106 (FIGS. 1 and 2) as described, i.e., children are alternatively represented or not represented in navigation graph 106.

Cached flag 712B contains data indicating whether the subject item of link record 700 is stored in item cache 324. When view/cache manager 406 stores the subject item of link record in item cache 324, view/cache manager 406 issues signals to navigation graph manager 412 which cause navigation graph manager 412 to include in cache flag 712B data indicating that the subject item is stored in item cache 324. When view/cache manager 406 removes the subject item of link record 700 from item cache 324 as described above, view/cache manager 406 issues signals to navigation graph manager 412 which cause navigation graph manager 412 to include in cache flag 712B data indicating that the subject item is not stored in item cache 324. When retrieving an item, network manager 404 queries navigation graph manager 412 to determine (i) if a link record referencing the item is included in navigation file 322 and (ii) if so, whether the cache flag of the link record indicates that the item is stored in item cache 324. If (i) and (ii) are resolved in the affirmative, network manager 404 retrieves the item from item cache 324 through view/cache manager 406 rather than from computer network 310 through network access device 308. Additionally, display manager 408 uses cache flag 712B to display to the user information indicating whether the subject item of the link represented by link record 700 is cached. In one embodiment, icons and associated descriptions in navigation graph 106 (FIGS. 1 and 2) are represented in one color, e.g., purple, if the subject item is cached and in another color, e.g., blue, otherwise.

Viewable flag 712C (FIG. 7) of view state 712 indicates whether the link represented by link record 700 is normally represented, e.g., by an icon, in navigation graph 106 (FIGS. 1 and 2) as displayed in navigation window 102 (FIG. 1). In general, in-line images are not viewable. In an HTML document, an in-line image is a graphical image which is stored as an item separately from the HTML document but is displayed as a component of the substantive information of the HTML document. Technically speaking, an in-line image is incorporated into an HTML document by including in the HTML document a link to the in-line image item. However, this type of link cannot be followed by the user, i.e., the user cannot select this link to retrieve the item referenced, since the subject item is already retrieved.

Type field 716 of link record 700 contains data specifying the type of the subject item. In displaying icons within navigation graph 106 (FIGS. 1 and 2) to represent the various links recorded as link records in navigation file 322 (FIG. 4), display manager 408 queries the type of the link as indicated by the contents of type field 716. For example. (a) a link whose type data, i.e., data stored in type field 716, indicates a link to an FTP directory is represented with a folder icon as described above; (b) a link whose type data indicates an FTP file is represented with a document icon: (c) a link whose type data indicates an FTP root directory or an HTML document is represented with a book icon: (d) a link whose type data indicates a newsgroup is represented with a newspaper icon: and (e) a link whose type data indicates an E-mail message is represented with a letter icon. As described above, the particular design of icons used to represent the various links of navigation file 322 is not essential to the present invention, and other shapes and designs of icon can be used to present to the user the hierarchical inter-relationships between the various links represented in navigation graph 106 (FIG. 2).

Filtering flags field 718 of link record 700 contains a number of flags used by filters 410A–E to determine the type of information produced from parsing the subject item of the link represented by link record 700. Filtering flags field 718 includes a list flag and a HTML flag. Only if the list flag is set, the one of filters 410A–E parsing the subject item sends to navigation graph manager 412 links parsed from the subject item. Analogously, the one of filters 410A–E parsing the subject item sends to view/cache manager 406 for display in view window 104 (FIG. 1) HTML data resulting from the parsing of the subject item only if the HTML flag is set.

Fields 720–726 are used to record the inter-relationships of the various link records stored in navigation file 322. Each of the pointer fields of a link record contains a pointer which uniquely identifies a link record in navigation file 322 or is null to indicate that no link record is identified. A link record can be uniquely Identified by a unique link record number, a unique textual link record identifier, or an address within memory 304 at which the identified link record is stored. If a pointer uniquely identifies a link record, the pointer "points to" that link record.

Parent pointer field 720 contains a pointer to the parent of the link represented by link record 700. For example, the parent of the link represented by the link record which is in turn represented by icon 216A (FIG. 2) is represented by the link record which is in turn represented by icon 212A. If parent pointer field 720 is null, the link represented by link record 700 has no parent. For example, in navigation graph 106 (FIG. 2), icon 202A represents a link record which in turn represents a link which has no parent.

Children pointer field 722 contains a pointer to the first child of the link represented by link record 700. For example, the link record represented by icon 216A (FIG. 2) represents a link which is a child of the link represented by the link record which is in turn represented by icon 212A. Children pointer field 722 contains a pointer to only one of the children of the link represented by link record 700, which are linked together in a double-linked list.

If children pointer field 722 is null, link record 722 represents a link which has no children. Such may be the case with respect to items which are files of a directory accessed according to a file transfer protocol, which by their nature do not contain links to other items, or with respect to link records whose subject items have not yet been parsed for additional links. The latter case arises, for example, when a link is parsed from an item as described above and that link is represented in navigation file 322 by a link record whose subject item has not yet been retrieved. In such a case, the subject item of that link record may contain links to other items and those links would be children of the link represented by that link record. However, the children pointer field of that link record contains a null pointer until those children are discovered. i.e., until the subject item of that link record is retrieved and the links contained therein parsed from the subject item.

Next peer pointer field 724 and last peer pointer field 726 are used to maintain a double-linked list of link records which represent respective peers. For example, the next peer pointer field of the link record represented by icon 214A (FIG. 2) contains a pointer which points to the link record represented by icon 216A. Accordingly, the last peer pointer field of the link record represented by icon 216A contains a pointer which points to the link record represented by icon 214A. If link record 700 is the first link record in the double-linked list, last peer pointer field 726 is null. i.e., contains a null pointer. Similarly, if link record 700 is the last link record in the double-linked list, first peer pointer field 724 is null. Accordingly, if link record 700 is the only link record in the double-linked list, i.e., represents the only child of the parent of the link represented by link record 700, both first peer pointer field 724 and last peer pointer field 726 are null.

Thus, link record 700 represents a link which in turn references an item which is accessible through computer network 310 (FIG. 3). The relationships between link record 700 and other link records stored in navigation file 322 (FIGS. 3 and 4) are represented in pointer fields 720–726 (FIG. 7). Those relationships are in turn represented to the user in navigation graph 106 (FIGS. 1 and 2). As a result, the user is presented with graphical representations of items and all links which are contained within those items and which reference other items. Accordingly, the user can quickly locate a particular item by reference to a concise graphical representation of the hierarchical organization within which the particular item is stored. The benefit of such a user-interface is best appreciated by way of the following example.

One type of item retrieved through computer network 310 is an HTML document. In an HTML document, links to HTML documents and other non-HTML documents are embedded in the text or graphics of the HTML document itself. In currently available network clients which enable a user to view HTML documents, an HTML document is displayed and text or graphics within the HTML document which are associated with links are generally highlighted. For example, an HTML document discussing bicycles (sometimes referred to as the "bicycle HTML document") might mention mountain bikes and include a link to another HTML document which discusses mountain bikes in greater detail (sometimes referred to as the "mountain bike HTML document"). In such a case, the text "mountain bikes" in the bicycle HTML document is highlighted and associated with a link referencing the mountain bike HTML document.

The user issues a command to retrieve the mountain bike HTML document by selecting the highlighted text "mountain bikes" using conventional techniques. For example, the highlighted text can be selected by user manipulation of pointing device 314 to place a cursor (not shown) over the highlighted text and actuating pointing device 314. e.g., by pressing a button (not shown) on pointing device 314. In response to the selection, the mountain bike HTML document is retrieved and displayed for the user. If the mountain bike HTML document contains links to other documents, those links are highlighted and the user can "follow" those links, i.e., request retrieval and display of the items referenced by those links, in an analogous manner.

In this example, the mountain bike HTML document can contain links associated with such text as "women's mountain bikes," "children's mountain bikes," "tandem mountain bikes," "front suspension," and "rear suspension" which reference other HTML documents discussing each of those topics in greater detail. If a user knows only the URN for the bicycle HTML document and wishes to retrieve information regarding linkage systems for front suspension of mountain bikes, i.e., the "destination topic", the user must request retrieval and display of the bicycle HTML document and read through the text for a highlighted textual or graphical mention of a topic closer to the destination topic. Frequently, an HTML document is too large to be displayed in its entirety in a view window of a computer display screen. Typically, a portion of the HTML document is displayed and the user scrolls through the document in a conventional manner to thereby select different portions of the document for display in the computer display device. In the current example, the user reads for the highlighted text "mountain bikes" representing a link to the mountain bike HTML document, scrolling through the bicycle HTML document if necessary to display the portion of the bicycle HTML document containing such a link, and follows that link.

When viewing the mountain bike HTML document, the user reads for and finds a link whose associated text is "front suspension", again scrolling the mountain bike HTML document if necessary to display the portion of the mountain bike HTML document containing that link. The user follows that link to retrieve and display the HTML document describing front suspension systems for mountain bikes in greater detail. In an analogous manner, the user reads for, finds, and follows a link referencing an HTML document discussing linkage front suspension systems for mountain bikes.

Navigating HTML documents in this way can be quite helpful if the user has only a vague idea as to what the user hopes to find. However, if the user knows quite specifically what the user hopes to find, or if the user has previously located the destination topic in an HTML document and wishes to quickly locate the same HTML document, such a method of HTML document navigation can be quite burdensome and even annoying. For example, if the user mistakenly follows a link to an HTML document discussing tandem mountain bikes and follows a link therefrom to an HTML document discussing transportation racks for tandem mountain bikes, the user must generally retrieve and view additional intermediate HTML documents to "backtrack" to the mountain bike HTML document. Specifically, the user must issue a command to retrieve and view the previously viewed HTML document discussing tandem mountain bikes and issue the same command again to retrieve and view the mountain bike HTML document. Another disadvantage of the "backtrack" approach is that the user "backtracks" blindly in that the link followed is disassociated with the substantive information of the HTML document being read. Users tend to remember in any significant detail only the last two HTML documents read. Therefore, once the user has "backtracked" twice, the user frequently becomes "lost" in the web of HTML documents.

Some currently available HTML document browsers, i.e., computer programs by which a user retrieves and views HTML documents, enable a user to mark a particular HTML document and then to immediately and directly retrieve the marked HTML document. In this illustrative example, the user would have had to anticipate the user's error and mark the mountain bike HTML document prior to following the link to the HTML document discussing tandem mountain bikes. Even if the user anticipates the error and marks the mountain bike HTML document, the mountain bike HTML document is retrieved and viewed before the user can follow the link to the HTML document discussing front suspension for mountain bikes. Such requires significant time and frustrates the user.

Figure 8A:
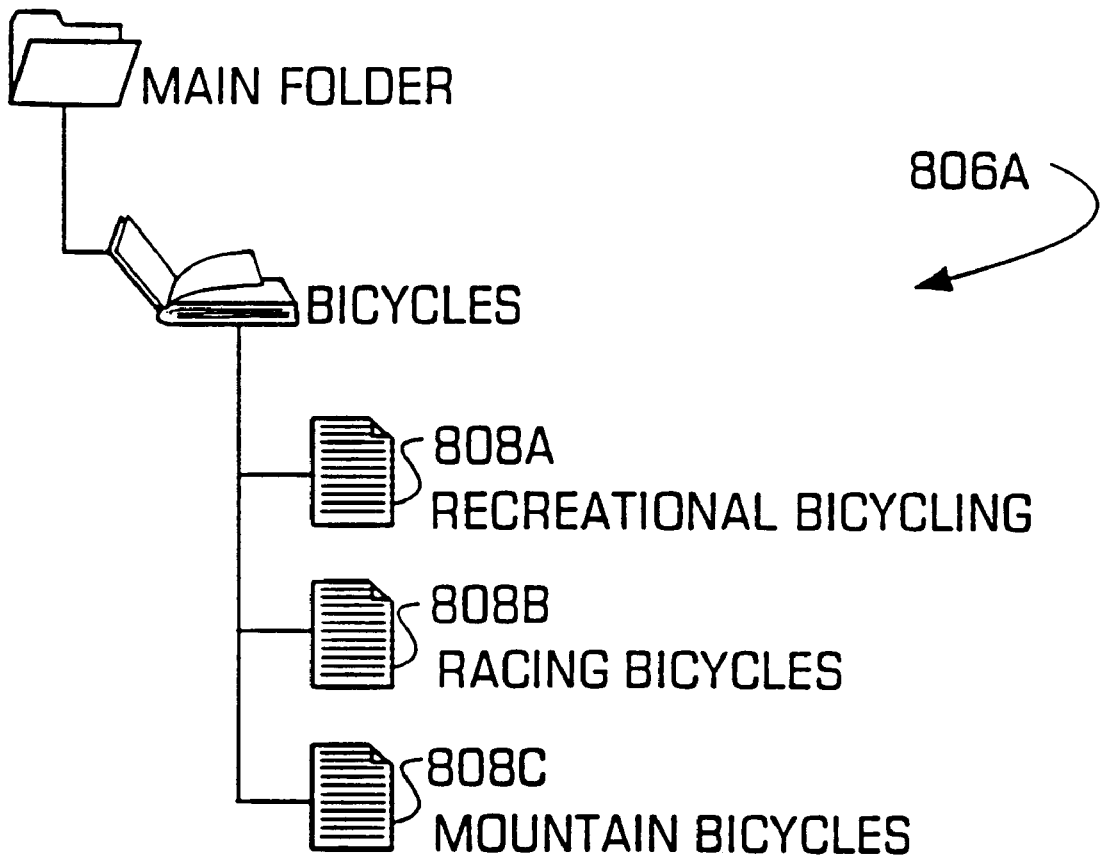
FIGS. 8A–C are diagrams of navigation graphs according to the present invention.

The same illustrative example is now described in the context of the present invention. The user first enters the URN for the bicycle HTML document. The bicycle HTML document is retrieved and displayed in view window 104 (FIG. 1). At the same time, links embedded in the bicycle HTML document are parsed therefrom and link records representing those links are generated and stored in navigation file 322 (FIG. 3). Navigation graph manager 412 creates navigation graph 806A (FIG. 8A) from these link records and causes display manager 408 to display navigation graph 806A in navigation window 102 (FIG. 1) in the manner described above. At this point, if the user is not familiar with the types of bicycles associated with these links, the user can navigate the bicycle HTML document using view window 106 (FIG. 1) in the conventional manner described above, reading the text near the respective links to learn more about the various types of bicycles. Conversely, if the user is familiar with these types of bicycle, the user can select any of icons 808A–C (FIG. 8A) representing links associated with "Recreational Bicycling," "Racing Bicycles," and "Mountain Bicycles," respectively, without reading the text of the bicycle HTML document discussing bicycles and without scrolling to display the portion of the bicycle HTML document containing the desired link. The user selects icon 808C to follow the link associated with "Mountain Bicycles."

Figure 8B:
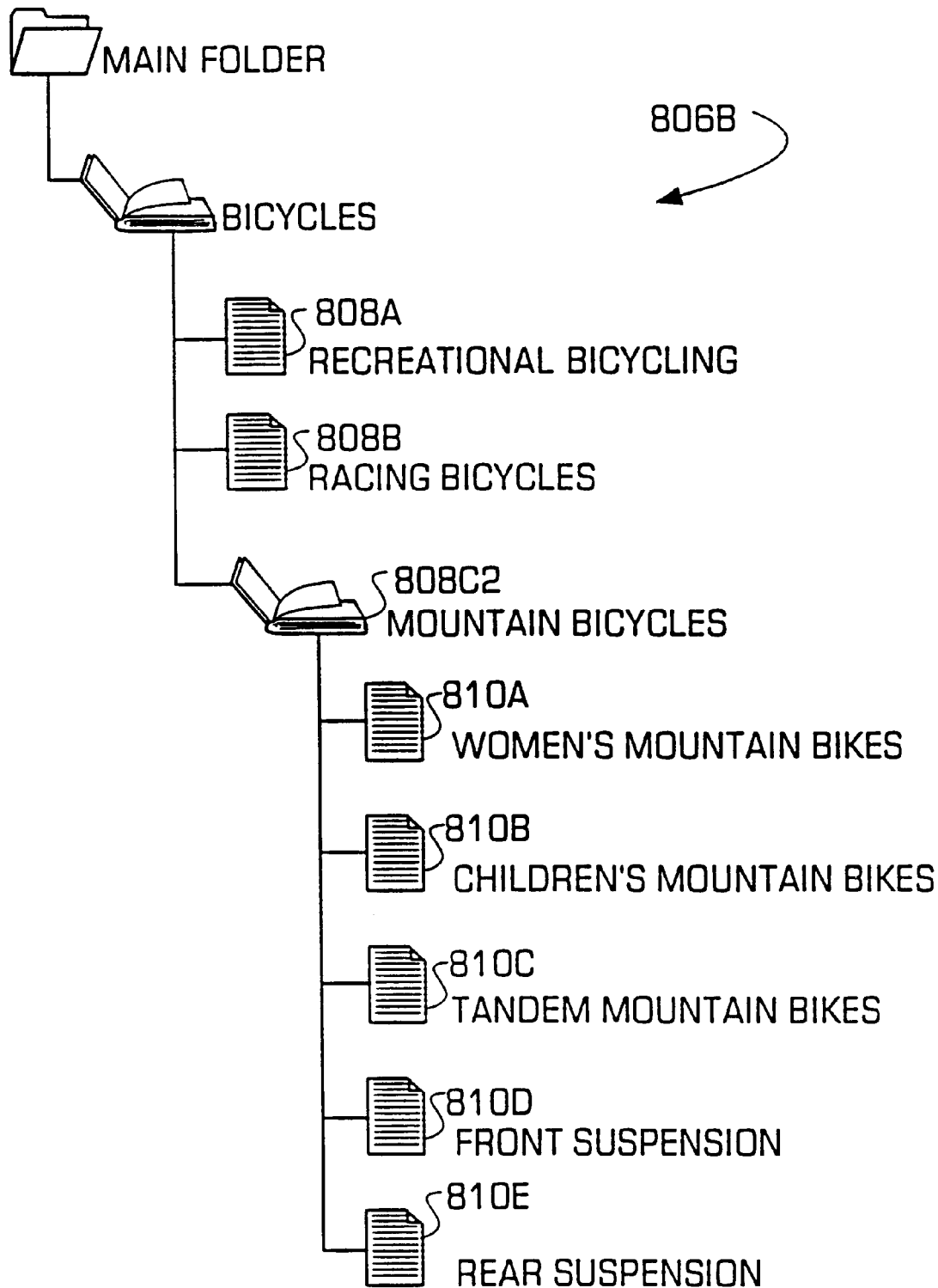

As a result, the mountain bike HTML document is retrieved, parsed, and displayed in view window 104 (FIG. 1) in the manner described above. The links parsed from the mountain bike HTML document are represented by link records which are added to navigation file 322 (FIG. 3) in the manner described above. Navigation graph 806A (FIG. 8A) is replaced within navigation window 104 (FIG. 1) with navigation graph 806B (FIG. 8B) which is generated by navigation graph manager 412 (FIG. 4) using navigation file 322. Since the type of item associated with the link represented by icon 808C (FIG. 8A), which was previously shown as a document to represent a link to an item whose type is unknown, is now known, icon 808C is replaced with icon 808C2 (FIG. 8B). Icon 808C2 is shown as an open book to represent a link to an HTML document whose links are represented in navigation graph 806B. The links parsed from the mountain bike HTML document are represented by icons 810A–E. In this example, the user selects icon 810D, which is associated with "Front Suspension," perhaps because the user is relatively certain that the user desires information contained in the item referenced by the link represented by icon 810D.

Figure 8C:
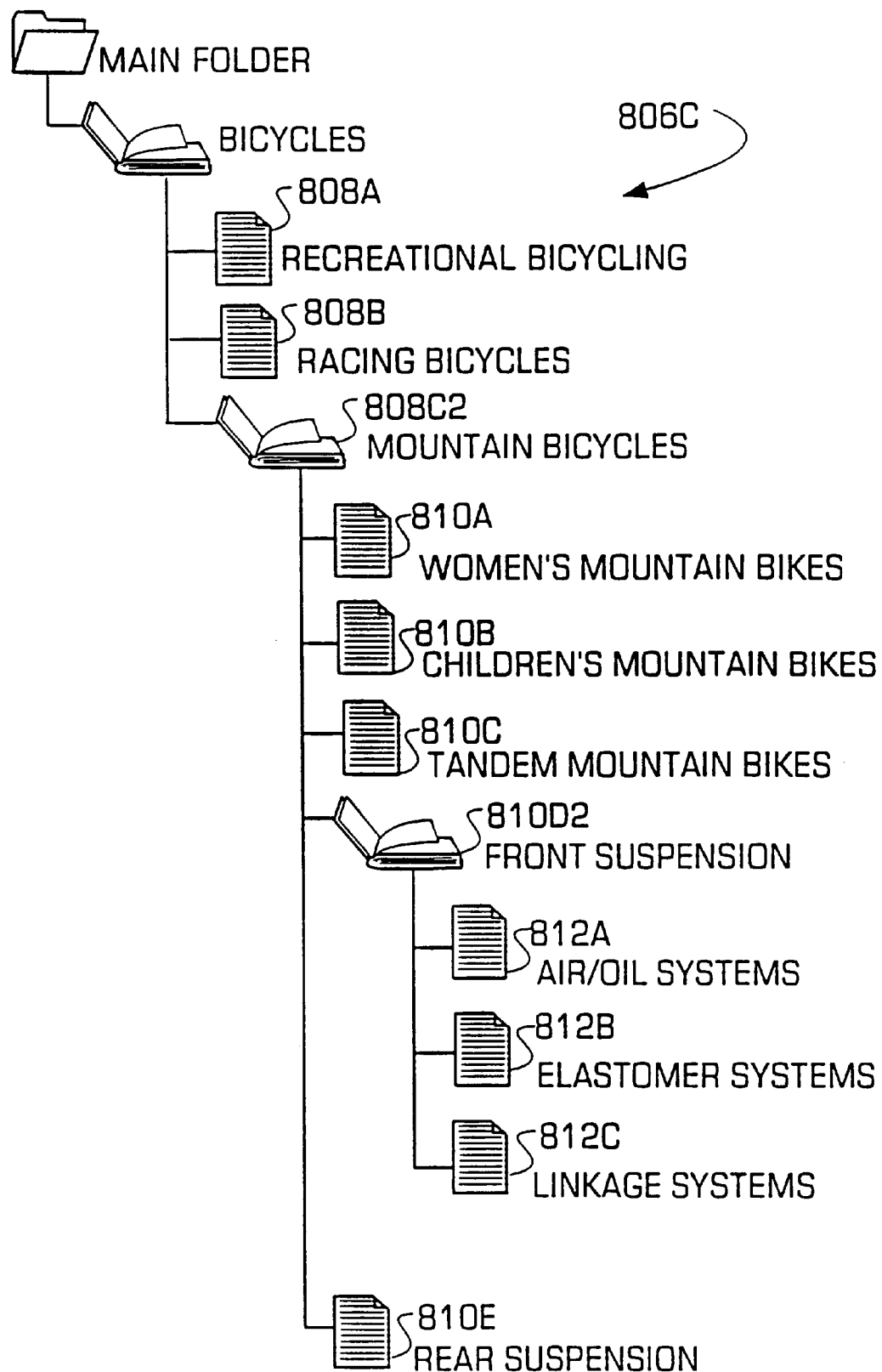

As a result, the HTML document discussing front suspension for mountain bikes (the "front suspension HTML document") is retrieved, parsed, and displayed in view window 104 (FIG. 1) in the manner described above. The links parsed from the front suspension HTML document are represented by link records which are added to navigation file 322 (FIG. 3) in the manner described above. Navigation graph 806B (FIG. 8B) is replaced within navigation window 104 (FIG. 1) with navigation graph 806C (FIG. 8C) which is generated by navigation graph manager 412 (FIG. 4) using navigation file 322. Since the type of item associated with the link represented by icon 810D (FIG. 8B), which was previously shown as a document to represent a link to an item whose type is unknown, is now known, icon 810D is replaced with icon 810D2 (FIG. 8C). Icon 810D2 is shown as an open book to represent a link to an HTML document whose links are shown in navigation graph 806C. The links parsed from the suspension HTML document are represented by icons 812A–C. In this example, the user selects icon 812C, which is associated with "Linkage Systems," perhaps because the user is relatively certain that the user desires information contained in the item referenced by the link represented by icon 812C.

Thus, the user is able to quickly and intuitively find the HTML document discussing linkage front suspension systems for mountains bikes (the "destination HTML document") knowing only the URN for an HTML document discussing bicycles in general. The user is not required to read any of the text of the HTML documents retrieved prior to retrieval of the destination HTML document, and the user is not required to scroll through any document to find the desired links. In the example described above in which the user mistakenly follows two links to erroneously retrieve and view an HTML document discussing accessories for tandem bicycles, the user can immediately and directly retrieve and view the HTML document discussing front suspension for mountain bikes. The user does so by selecting from navigation graph 806B (FIG. 8B) icon 810D, which represents a link to the HTML document discussing front suspension for mountain bikes even though that HTML document was not previously retrieved. The ability to select from a list of links of a HTML document represents a significant improvement over currently available HTML browsers in terms of convenience and performance.

Further benefits over currently available HTML browsers are realized by the fact that navigation file 322, whose contents are represented in navigation graph 806C (FIG.

8C), is persistent as described above. As a result, the user can terminate network client 320 and switch the power off to computer system 300 and can return some time later, switch the power to computer system 300 on, and execute network client 320, and navigation graph 806C (FIG. 8C) is immediately regenerated from navigation file 322. The user can then immediately see the organization of the various HTML documents referenced by the links represented in navigation graph 806C and can immediately retrieve the destination HTML document by selecting icon 812C. Retrieving, viewing, and scrolling through intermediate HTML documents is entirely unnecessary. Accordingly, convenience and performance of network client 320 with respect to HTML documents and other items in which links are embedded in substantive information is significantly improved over currently available HTML browsers.

Many HTML documents include multiple links to the same item (sometimes referred to as "redundant links") and include links to the same HTML document being viewed (sometimes referred to as "self links"). For example, the HTML document discussing bicycles in the example above can make several references to "mountain bikes" and each such reference can be associated with a link to the mountain bike HTML document. In addition, the bicycle HTML document can include at the bottom a link to itself so that a user could easily begin re-reading the bicycle HTML document from its beginning. It is generally preferred that such redundant links and self links are not represented by link records in navigation file 322.

Logic flow diagram 900 (FIG. 9) illustrates the process by which navigation graph manager 412 prevents inclusion in navigation file 322 redundant and self links. The steps of logic flow diagram 900 are performed by navigation graph manager 412 in determining whether to include a link record representing a specific link, referred to in the context of logic flow diagram 900 as the subject link, in navigation file 322.

Processing begins in step 902 in which navigation graph manager 412 retrieves from navigation file 322 a link record representing the parent of the subject link. From step 902, processing transfers to test step 904 in which navigator graph manager 412 determines whether the subject link references the same item referenced by the parent of the subject link. If link record 700 (FIG. 7) represents the parent of the subject link, navigator graph manager 412 makes such a determination by canonical comparison of the data contained in URN field 704 with the URN of the subject link, which one of filters 410A–E parses and sends to navigator graph manager 412. If the two URNs identify the same item, i.e., if the two URNs in canonical form are identical, the subject link is a self link and processing transfers to terminal step 906 at which processing according to logic flow diagram 900 terminates without inclusion in navigation file 322 of a link record representing the subject link. Thus, self links are excluded from navigation file 322 according to logic flow diagram 900.

Conversely, if in test step 904 navigation graph manager 412 determines that the compared URNs identify distinct items, processing transfers from test step 904 to step 908. In step 908, navigation graph manager 412 retrieves from navigation file 322 a pointer to the first child of the parent of the subject link. If, for example, link record 700 represents the parent of the subject link, the first child of the parent is identified by a pointer in children pointer field 722 and that pointer is retrieved by navigation graph manager 412 and stored in a test pointer record. Processing transfers from step 908 to test step 910.

In test step 910, navigation graph manager compares the pointer stored in the test pointer record to a null. If the pointer stored in the test pointer record is a null, then there are no children of the parent of the subject link and processing transfers to step 912 in which navigation graph manager 412 generates a link record representing the subject link and stores the generated link record in navigation file 322. Also in step 912, navigation graph manager 412 updates the pointer in the children pointer field of the link record representing the parent of the subject link to point to the newly generated link record. Thus, the subject link is incorporated into navigation file 322. From step 912, processing transfers to terminal step 914 in which processing according to logic flow diagram 900 terminates.

If, on the other hand, navigation graph manager 412 determines in test step 910 that the pointer stored in the test pointer record is not a null, processing transfers to test step 916 in which navigation graph manager 412 retrieves from navigation file 322 the link record to which the pointer stored in the test pointer record points and determines whether the retrieved link record references the same item referenced by the subject link. In this way, navigation graph manager 412 determines whether the subject link is redundant in view of the retrieved link record. Navigation graph manager 412 retrieves the URN from the URN field of the retrieved link record and compares the retrieved URN to the URN of the subject link in the manner described above with respect to test step 904. If the two URNs compared in test step 916 identify the same item, the subject link is determined to be redundant and processing transfers from test step 916 to terminal step 914 in which processing according to logic flow diagram 900 terminates without adding a link record representing the subject link to navigation file 322.

Conversely, if in test step 916 the two compared URNs identify distinct items, processing transfers to step 918. In step 918, navigation graph manager 412 retrieves the pointer to the next peer of the link record retrieved in test step 916 and stores that pointer in the test pointer record. If, for example, link record 700 is the link record retrieved in test step 916, the pointer to the next peer is retrieved from next peer pointer field 724. Processing transfers from step 915 to test step 910 which is described above. Thus, steps 910, 916, and 918 form a loop in which each of the children of the parent of the subject link are processed. When navigation graph manager 412 has processed all of the children of the parent of the subject link, the pointer stored in the test pointer record is determined to be null in test step 910, processing transfers therefrom to step 912 which is described above.

As described above, navigation graph manager 412 generates, in step 912, a link record representing the subject link and stores the newly generated link record in navigation file 322. In addition, navigation graph manager 412 replaces the null pointer last stored in the test pointer record with a pointer to the newly generated link record. In the case in which processing transfers from step 918 through test step 910 to step 912, the null pointer last stored in the test pointer record is the next peer pointer retrieved from the link record retrieved in the most recent performance of test step 916. In the case in which processing transfers directly from step 908 through test step 910 to step 912, the null pointer last stored in the test pointer record is the children field pointer of the link record representing the parent of the subject link.

In addition, the parent and last peer pointers of the newly generated link record are updated. For example, if link record 700 is the newly created link record, navigation graph manager 412 stores in parent pointer field 720 a pointer to the link record representing the parent of the subject link and stores in last peer pointer field 726 a pointer to the link record representing the last peer of the subject link. In the case in which processing transfers from step 918 through test step 910 to step 912, navigation graph manager 412 stores in last peer pointer field 726 a pointer to the link record most recently retrieved in test step 916. In the case in which processing transfers from step 908 through step 910 directly to step 912, navigation graph manager 412 stores in last peer pointer field 726 a null since the subject link is the first child of the parent of the subject link. Thus, the newly generated link record is appended to the double-linked list of children of the parent of the newly generated link record and thereby incorporated into navigation file 322.

Figure 10:
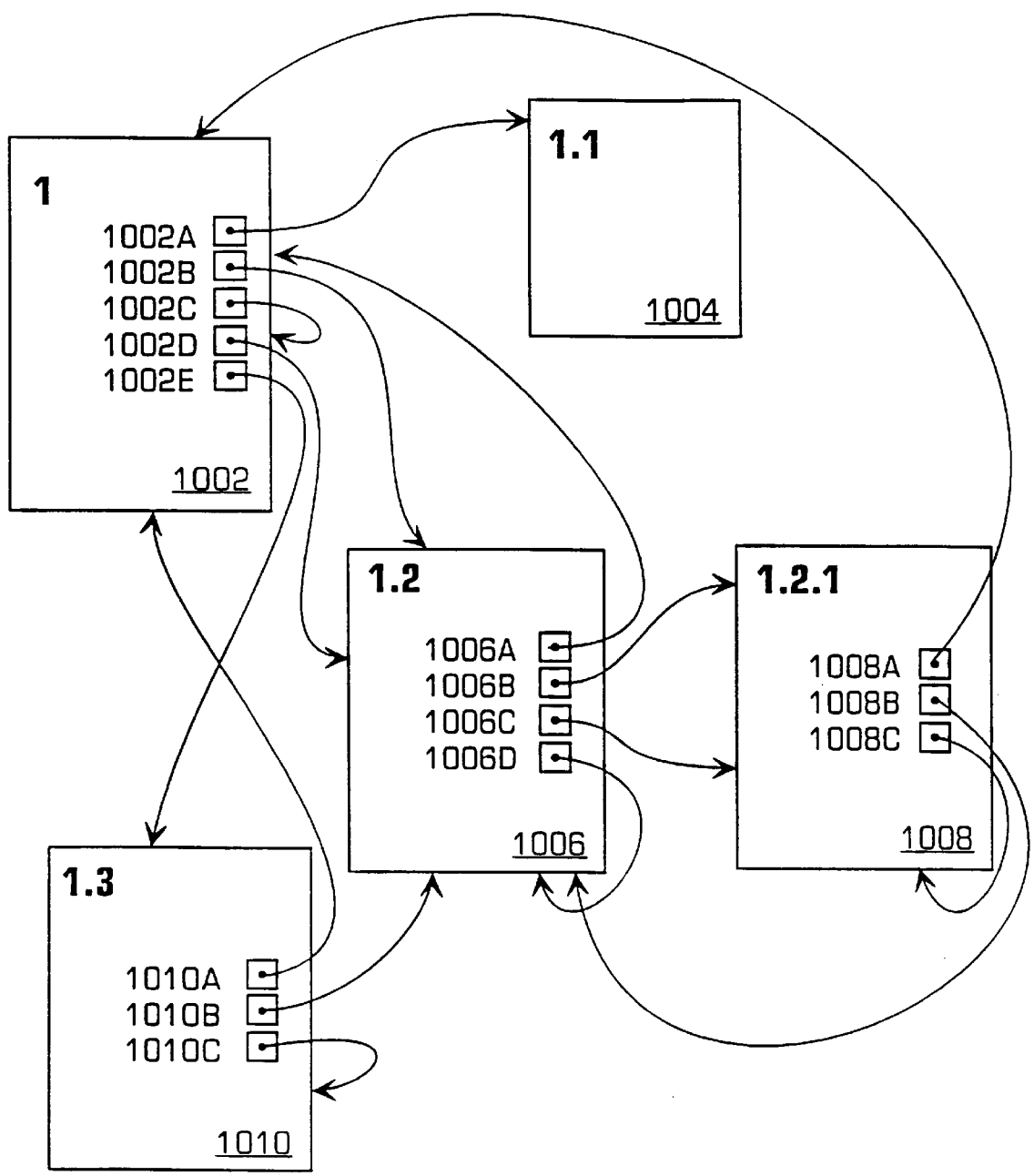
FIG. 10 is a block diagram of a number of items containing links to one another.

In another embodiment of the present invention, links which are redundant in view of any link record stored in navigation file 322 (sometimes referred to as "generally redundant links") are excluded from navigation file 322. The benefits of excluding self links and redundant links are illustrated in FIGS. 10 and 11A–C. FIG. 10 is a block diagram of items 1002, 1004, 1006, 1008, and 1010 which contains links to one another as shown. Specifically, (i) item 1002 contains links 1002A–E to items 1004, 1006, 1002, 1006, and 1010, respectively; (ii) item 1004 contains no links; (iii) item 1006 contains links 1006A–D to items 1002, 1008, 1008, and 1006, respectively; (iv) item 1008 contains links 1008A–C to items 1002, 1006, and 1008, respectively; and (v) item 1010 contains links 1000A–C to items 1002, 1006, and 1010, respectively. Thus, links 1002C, 10060, 1008C, and 1010C are self links, and links 1002D and 1006C are redundant in view of respective peer links 1002B and 1006B. Links 1006A, 1008A, 1008C, 1010A, and 1010B are generally redundant as described more completely below in the context of FIG. 11C.

Figure 11A:
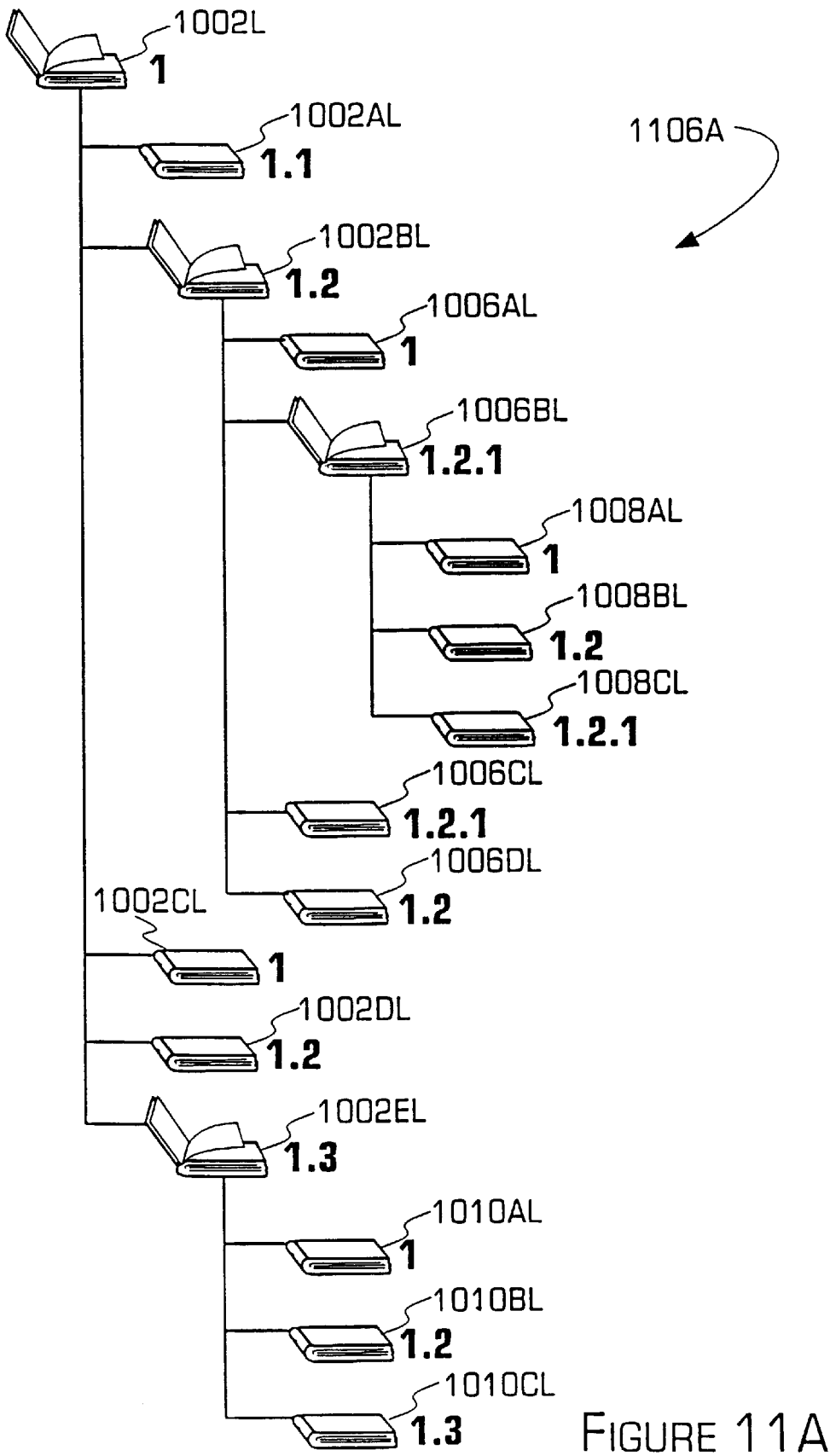
FIGS. 11A–C are diagrams of navigation graphs which represent the inter-relationships of the items of FIG. 10.
Figure 11B:
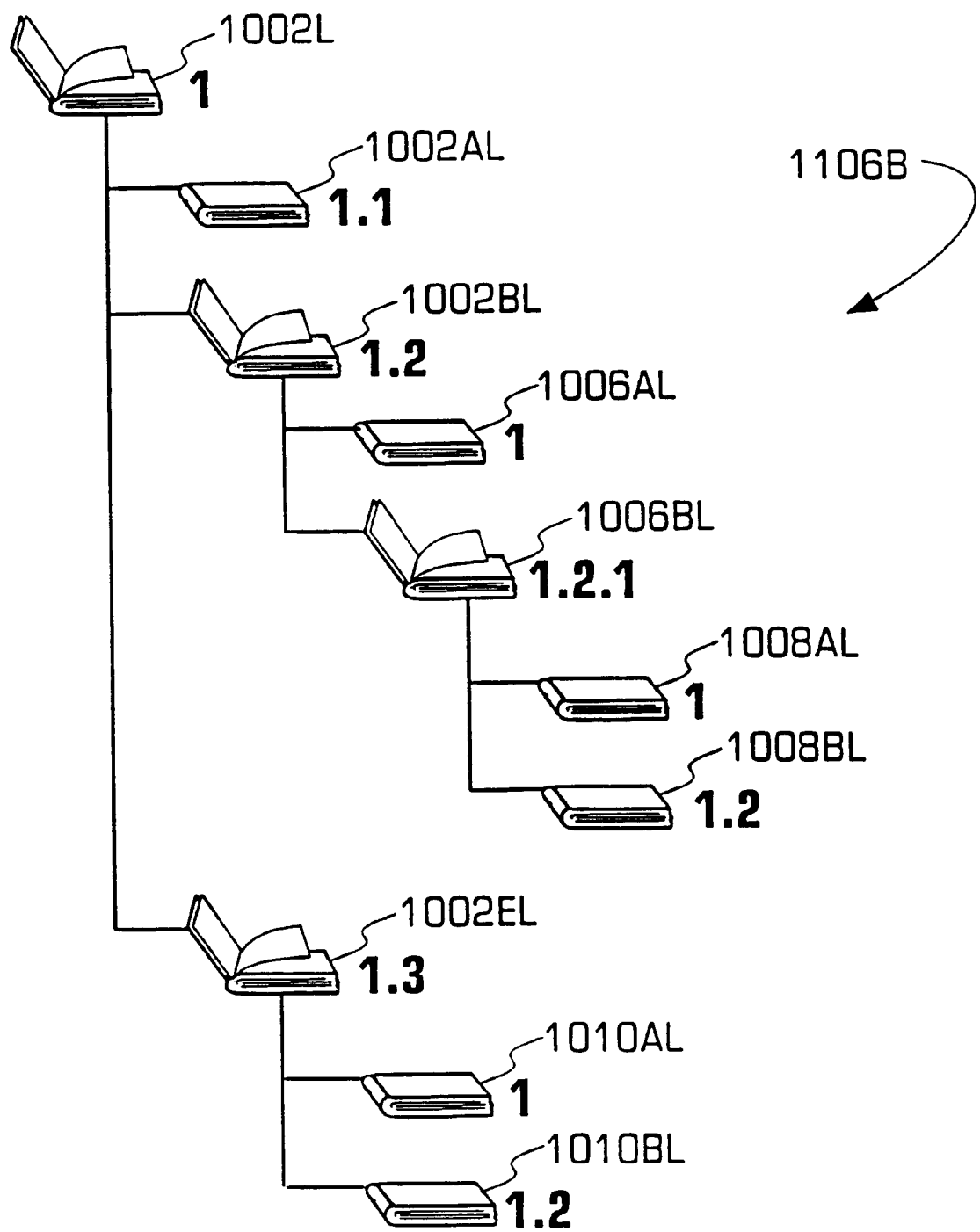
Figure 11C:
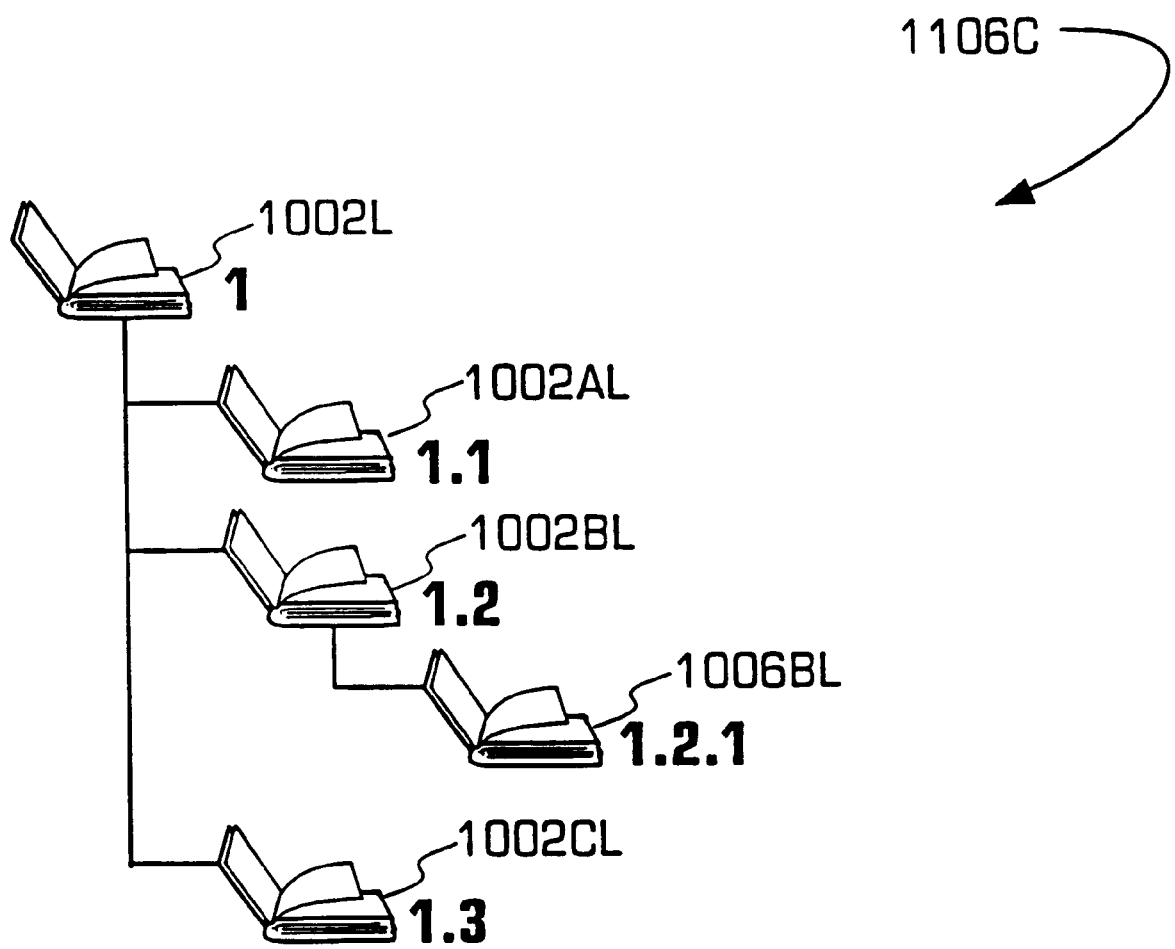

FIG. 11A shows a navigation graph 1106A in which all self links and redundant links are included. Each icon of navigation graph 1106A represents a corresponding link of FIG. 10 and is referenced in FIG. 11A by a reference numeral which is formed by appending an "L" to the reference numeral of the corresponding link. For example, icon 1002AL represents link 1002A (FIG. 10). In navigation graph 1106A (FIG. 11A), all redundant and self pointers are shown as closed books such that the children of each of the redundant and self links represented in navigation are not also represented in navigation graph 1106A. For example, if icon 1006AL, which represents a link to item 1002 (FIG. 10), were shown in navigation graph 1106A as an open book and the children of the link represented by icon 1006AL were included in navigation graph 1106A, the entirety of navigation graph 1106A excluding icon 1002L would be replicated and inserted under icon 1006AL and above icon 1006BL. Navigation graph 1106A is quite complex, even in the relatively condensed form represented in FIG. 11A, especially when considering that navigation graph 1106A represents links to only five (5) items.

Figure 9:
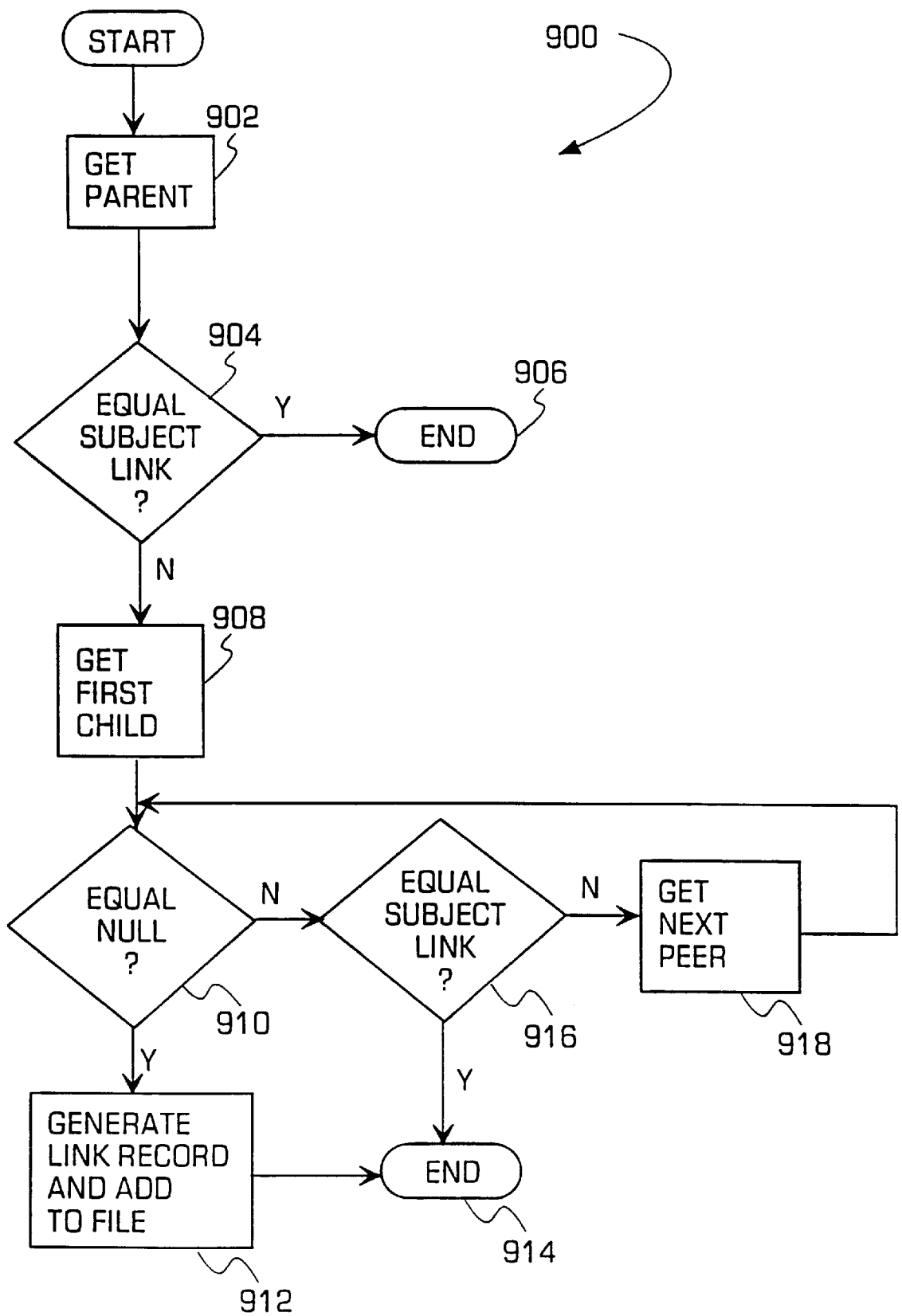
FIG. 9 is a logic flow diagram of the removal of self links and redundant links in accordance with the present invention.

Navigation graph 1106B (FIG. 11B) results from processing the links of FIG. 10 according to logic flow diagram 900 (FIG. 9). The icons of navigation graph 1106B (FIG. 11B) represent only those links of FIG. 10 which are not self pointers and which are not redundant in view of a peer link previously represented in navigation graph 1106B. Navigation graph 1106B is a significant improvement over navigation graph 1106A (FIG. 11A) but still includes multiple links to the same item.

Navigation graph 1106C (FIG. 11C) results from excluding from navigation graph 1106C links which are generally redundant. Navigation graph 1106C (FIG. 11C) is the simplest graph which completely represents all of the items of FIG. 10 and generally represents the relationships between those items.

Many varying embodiments and implementations of the principles of the present invention will be suggested to those skilled in the art to which the present invention pertains by the preceding description. The preceding description is illustrative only and is not limiting. Instead, the present invention is limited only by the claims which follow

What is claimed is:

1. A method for displaying information from a variety of different sources on a computer network, the method comprising:

generating a graphical structure which includes a first link to a first item originating from a first information source and a second link to a second item originating from a second information source, the first and second links being displayed in a hierarchical relationship to each other, the information in the first information source being accessible according to a first protocol and the second information source being accessible according to a second different protocol; and displaying the hierarchical relationship of the first and second items so that a user may access a particular item using the access protocol associated with that particular item.

2. The method of claim 1, wherein said first network access protocol comprises a post office protocol (POP), said first item comprises an electronic mail message, said second network access protocol comprises a usenet newsgroup protocol and said second item comprises a newsgroup posting.

3. The method of claim 1, further comprising receiving data from the first and second information sources using one or more filters that convert the data from the one or more network access protocols into a navigation format.

4. The method of claim 1, further comprising displaying the first item on the display device.

5. The method of claim 1, further comprising parsing from the first item one or more child links to one or more referenced items, each of which is accessible according to a corresponding network access protocol.

6. The method of claim 5, further comprising adding representations of the child links to the hierarchical graphical structure.

7. The method of claim 1 wherein displaying the hierarchical graphical structure comprising displaying in a display device, for each of the first and second links, a respective corresponding one of two or more icons, and displaying in the display device connections between the one or more icons, the connections representing hierarchical interrelationships between the corresponding items.

8. The method of claim 1 wherein generating the graphical structure includes generating one or more children of the first link.

9. The method of claim 8 wherein generating the graphical structure includes generating one or more children of the second link.

10. The method of claim 9 wherein generating the graphical structure includes generating graphical representation of child, parent, and peer relationships between the first and second links and the children of the first and second links.

11. The method of claim 1 further comprising storing the hierarchical graphical structure in persistent storage.

12. An apparatus for displaying information from a variety of different sources on a computer network, the apparatus comprising:

means for generating a graphical structure which includes a first link to a first item originating from a first information source and a second link to a second item originating from a second information source, the first and second links being displayed in a hierarchical relationship to each other, the information in the first information source being accessible according to a first protocol and the second information source being accessible according to a second different protocol; and means for displaying the hierarchical relationship of the first and second items so that a user may access a particular item using the access protocol associated with that particular item.

13. The apparatus of claim 12, wherein said first network access protocol comprises a post office protocol (POP), said first item comprises an electronic mail message, said second network access protocol comprises a usenet newsgroup protocol and said second item comprises a newsgroup posting.

14. The apparatus of claim 12 further comprising one or more filters that receive data from the first and second information sources and convert the data from the one or more network access protocols into a navigation format.

15. The apparatus of claim 12 further comprising means for determining additional links to additional items that are accessible by corresponding network access protocols that are discovered as the user browses resources on the computer network, means for generating additional representations for those additional discovered items and means for storing the additional representations in the graphical structure so that the additional discovered items are displayed.

16. The apparatus of claim 12 further comprising a display that displays the first item.

17. The apparatus of claim 12 further comprising means for parsing, from the first item, one or more child links to one or more referenced items, each of which is accessible according to a corresponding network access protocol.

18. The apparatus of claim 17 further comprising means for adding representations of the child links to the hierarchical graphical structure.

19. The apparatus of claim 12 wherein the hierarchical graphical structure comprising a display device that displays, for each of the first and second links, a respective corresponding one of two or more icons, and that displays connections between the one or more icons, the connections representing hierarchical interrelationships between the corresponding items.

20. The apparatus of claim 12, wherein the graphical structure includes means for generating one or more children of the first link.

21. The apparatus of claim 20 wherein the graphical structure includes means for generating one or more children of the second link.

22. The apparatus of claim 21 wherein the graphical structure includes means for generating graphical representation of child, parent, and peer relationships between the first and second links and the children of the first and second links.

23. The apparatus of claim 12 further comprising a persistent storage device that stores the hierarchical graphical structure.

24. An apparatus for displaying a plurality of items to a user, the items being accessible using a variety of different network access protocols, the apparatus comprising:

means for generating a representation of a first item which may be accessed using a first network access protocol from a first source;

means for generating a representation of a second item which may be accessed using a second network access protocol from a second source; and means for generating a hierarchical graphical structure including the first and second items so that a user may access the first and second items from the hierarchical graphical structure.

25. An apparatus for displaying a plurality of items to a user, the items being accessible using a variety of different network access protocols, the apparatus comprising:

one or more filters for receiving data from one or more sources using one or more network access protocols and for converting the data from the one or more network access protocols into a navigation format; and a navigation graph comprising a hierarchical display of items representing one or more items from the one or more sources which are accessed using one or more different network access protocols and means for displaying an item selected by the user in the navigation format.

26. A method for displaying information from a variety of different sources stored in a computer network, the method comprising:

generating a graphical structure which includes a news item being accessible using a news information protocol and an electronic mail item being accessible using a electronic mail message protocol; and displaying the news item and the electronic message item in a single hierarchical structure which permits the user to access the news item and the electronic message item from the same application.

27. An apparatus for displaying and accessing information about items from a variety of different sources stored in a computer network, the apparatus comprising:

means for generating a graphical structure which includes a news item being accessed using a news information protocol and an electronic mail item being accessible using a electronic mail message protocol;

means for displaying the news item and the electronic message item in a single hierarchical structure; and means for accessing the news item and the electronic message item which permits the user to access the news item and the electronic message item from the same application.

28. The method of claim 1 further comprising determining different links to additional items that are accessible by corresponding network access protocols that are discovered as the user browses resources on the computer network, generating additional representations for those additional discovered items and storing the additional representations in the graphical structure so that the additional discovered items are displayed.

* * * * *